United States Patent
Kayode

(10) Patent No.: US 12,205,201 B2
(45) Date of Patent: Jan. 21, 2025

(54) SYSTEMS AND METHODS FOR RESERVOIR HISTORY MATCHING QUALITY ASSESSMENT AND VISUALIZATION

(71) Applicant: Saudi Arabian Oil Company, Dhahran (SA)

(72) Inventor: Babatope Kayode, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 818 days.

(21) Appl. No.: 17/370,278

(22) Filed: Jul. 8, 2021

(65) Prior Publication Data

US 2022/0027616 A1 Jan. 27, 2022

Related U.S. Application Data

(60) Provisional application No. 63/054,301, filed on Jul. 21, 2020.

(51) Int. Cl.
*G06T 11/20* (2006.01)
*G01V 20/00* (2024.01)
(Continued)

(52) U.S. Cl.
CPC ............ *G06T 11/206* (2013.01); *G01V 20/00* (2024.01); *G06T 7/001* (2013.01); *E21B 41/00* (2013.01);
(Continued)

(58) Field of Classification Search
CPC ................... G06T 11/206; G06T 7/001; G06T 2207/30108; G06F 2218/12; G01V 20/00;
(Continued)

(56) References Cited

U.S. PATENT DOCUMENTS 7,384,602 B2 6/2008 Nagaoka et al.
7,739,089 B2 6/2010 Gurpinar et al.
(Continued)

OTHER PUBLICATIONS

Weijermars, Ruud, Fast Models of Hydrocarbon Migration Paths and Pressure Depletion Based on Complex Analysis Methods (CAM): Mini-Review and Verification, Jan. 2020, MDPI (Year: 2020).*

(Continued)

*Primary Examiner* — John E Johansen
(74) *Attorney, Agent, or Firm* — DINSMORE & SHOHL LLP

(57) ABSTRACT

Systems and methods are provided for determining and presenting field view history-matched well quality data. In one embodiment, a method includes receiving well data for a plurality of wells and performing a plurality of functional operations including a trend operation to determine well groups using pattern recognition of well time lapse pressure trends, the trend operation configured to identify at least one connected reservoir region (CRR), a geo-probe integration operation configured to integrate data for each CRR and evaluate a three-dimensional (3D) static model for wells; a history match advisor operation to generate a combined display of time dependent and depth dependent representation of the well data; a spatio-temporal operation configured to generate a space and time visualization of the well data; a front operation configured to track simulated injected fluid front; and an insight operation configured to report static changes between a well field model and history match model.

8 Claims, 22 Drawing Sheets

(51) Int. Cl.
    *G06T 7/00*     (2017.01)
    *E21B 41/00*    (2006.01)
(52) U.S. Cl.
    CPC .... *E21B 2200/20* (2020.05); *G01V 2210/624* (2013.01); *G01V 2210/644* (2013.01); *G01V 2210/663* (2013.01); *G06F 2218/12* (2023.01); *G06T 2207/30108* (2013.01)
(58) Field of Classification Search
    CPC ....... G01V 2210/624; G01V 2210/644; G01V 2210/663; E21B 41/00; E21B 2200/20
    USPC ...................................................... 703/6, 10
    See application file for complete search history.

(56) References Cited

U.S. PATENT DOCUMENTS

| | | | |
|---|---|---|---|
| 8,433,551 | B2 | 4/2013 | Fung et al. |
| 8,434,020 | B2 | 4/2013 | Martyn |
| 8,713,476 | B2 | 4/2014 | Martyn |
| 9,896,930 | B2 | 2/2018 | Al-Nahdi et al. |
| 10,054,712 | B2 | 8/2018 | Al-Nuaim et al. |
| 10,184,320 | B2 | 1/2019 | Al-Turki et al. |
| 10,534,871 | B2 | 1/2020 | Pomerantz et al. |
| 2003/0211010 | A1 | 11/2003 | Nagaoka et al. |
| 2007/0198234 | A1 | 8/2007 | Zangl et al. |
| 2012/0253770 | A1* | 10/2012 | Stern ................. G06F 30/20 703/10 |
| 2013/0096896 | A1* | 4/2013 | Al-Shahri ............ E21B 43/00 703/10 |
| 2018/0196162 | A1 | 7/2018 | Fung et al. |
| 2018/0240021 | A1* | 8/2018 | Al-Harbi ............ G06F 30/20 |
| 2019/0167496 | A1 | 6/2019 | Lambarth et al. |

OTHER PUBLICATIONS

Bryant et al., "History Matching in Parallel Computational Environments", Abstract Only, OSTI identifier 909699, pp. 1-3, Aug. 31, 2004.
Cavalcante et al., "History Matching through dynamic decision-making", Plos One, https://doi.org/10.1371/journal.pone.0178507, pp. 1-32, Jun. 5, 2017.
Chakra et al., "History matching of petroleum reservoirs employing adaptive genetic algorithm", J Petrol Explor Prod Technol, vol. 6, pp. 653-674, DOI 10.1007/s13202-015-0216-4, 2016.
Computer Modelling Group Ltd., "CoFlow-X User Guide" CMGL. CA—Future of Simulation, Aug. 2019.
Dynamic Graphics, Inc., "4D Visual Analytics and Data Integration with CoViz 4D", COVIZ 4D Product Sheet, 2016.
Esmaili et al., "Full field reservoir modeling of shale assets using advanced data-driven analytics", Geoscience Frontiers, vol. 7, pp. 11-20, 2016.
Halmoy et al., "Enhanced Field Surveillance through Real-Time Visualization", SPE 112131, presented at the 2008 SPE, Intelligent Energy Conference and Exhibition in Amsterdam, Feb. 25-27, 2008.
Hoffman et al., "A Practical Data-Integration Approach to History Matching: Application to a Deepwater Reservoir", Spe Journal, SPE 95557, 2005 SPE Annual Technical Conference and Exhibition, Dallas, pp. 464-479, Dec. 2006.
Intelligent Solutions, Inc., "Top-Down Intelligent Reservoir Models: Alternative to Traditional Numerical Reservoir Simulation and Modeling", pp. 1-18, 2011.
Lorentzen, "Hitory Matching a Full Field Reservoir Simulation Model (The Jette Field)", Norwegian University of Science and Technology, P:etroleum Geoscience and Engineering, Jun. 2014.
Mohaghegh et al., "Modeling, History Matching, Forecasting and Analysis of Shale Reservoirs Performance Using Artificial Intelligence", SPE International, SPE143875, pp. 1-12, Apr. 2011.
Rwechungura et al., "Advanced History Matching Techniques Reviewed", SPE International, SPE142497, pp. 1-19, Sep. 25-28, 2011.
Shahkarami, "Assisted History Matching Using Pattern Recognition Technology", Dissertation submitted to the Benjamin M. Statler College of Engineering and Mineral Resources at West Virginia University, 2014.
Vadicharla et al., "Optimization Techniquest for History Matching and Production Forecasting", International Journal of Recent Technology and Engineering, vol. 8, Issue 4, ISSN: 2277-3878, pp. 106-116, Nov. 2019.
Weijermars et al., "Fast Models of Hydrocarbon Migration Paths and Pressure Depletion Based on Complex Analysis Methods (CAM): Mini-Review and Verification", MDPI, Fluids, vol. 5, No. 7, 2020.
Weller, "Naval Gunfire Support of Amphibious Operations: Past, Present, and Future", Naval Surface Weapons Center, Mar. 28, 1978.
Wheelwright, "3 Oil and Gas Technology Trends that Are Improving the Industry", Dynamic Graphics, Inc., https://www.dgi.com/oil-and-gas-technology-trends/, Oct. 15, 2019.
White, "Application of Real-Time Well Monitoring for Optimized Productivity", Dynamics Graphics, Inc., https://www.dgi.com/real-time-well-monitoring/, Sep. 1, 2020.
International Search Report and Written Opinion dated Nov. 10, 2021 pertaining to International application No. PCT/US2021/042273 filed Jul. 20, 2021, 19 pages.
Kayode, B. O. et al. "Pressure Conditioned Modeling: Application of Time-Lapse Shut-in Pressure Data to Map Connected Reservoir Regions for Conditioning of 3-D Geomodel Property Distributions", Society of Petroleum Engineers, Apr. 23, 2018, pp. 1-15.
Kayode, B. et al. "Forward Integration of Dynamic Data into 3-D Static Modeling Significantly Improves Reservoir Characterization", International Petroleum Technology Conference (IPTC), Mar. 22, 2019, pp. 1-12.

\* cited by examiner

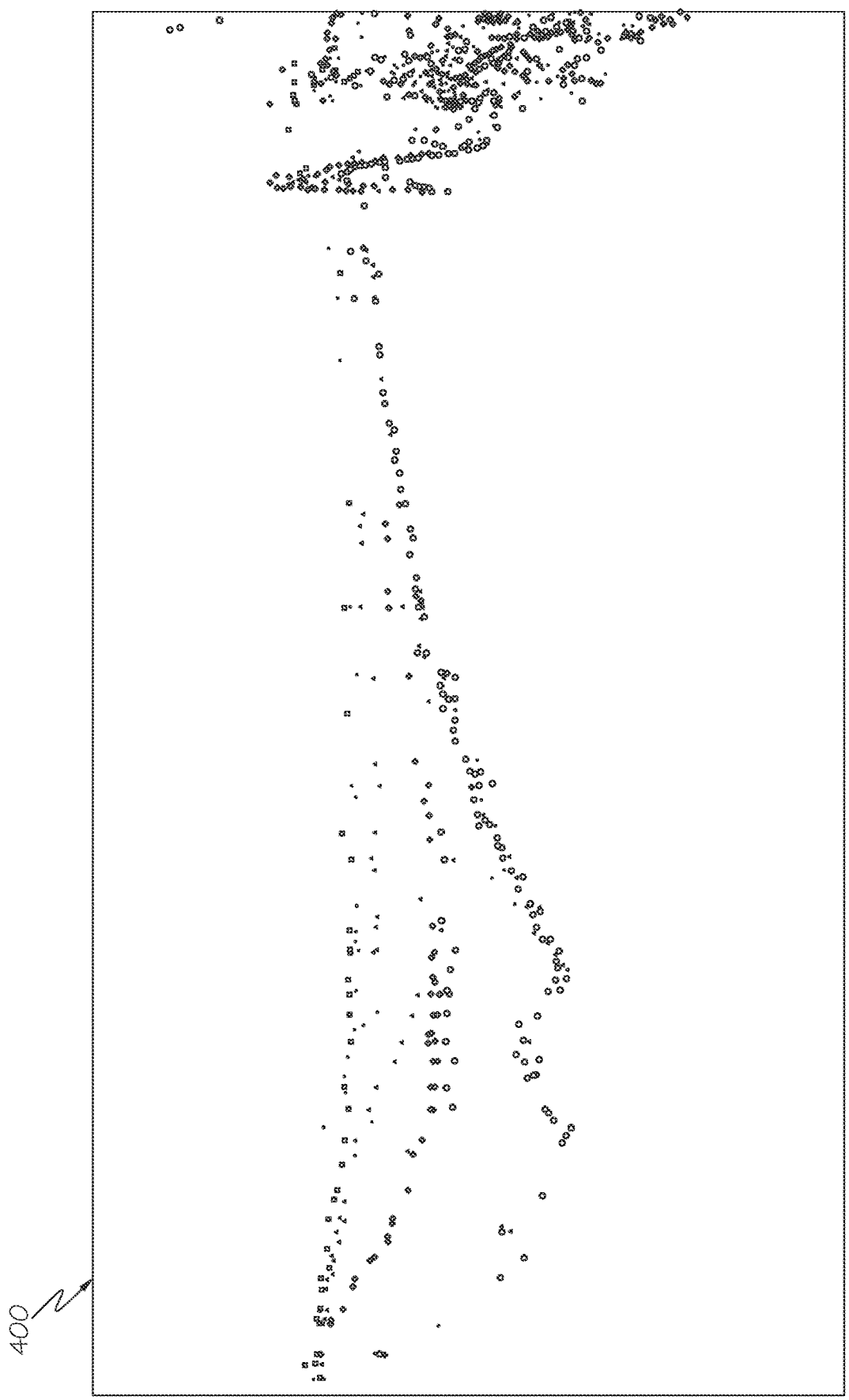

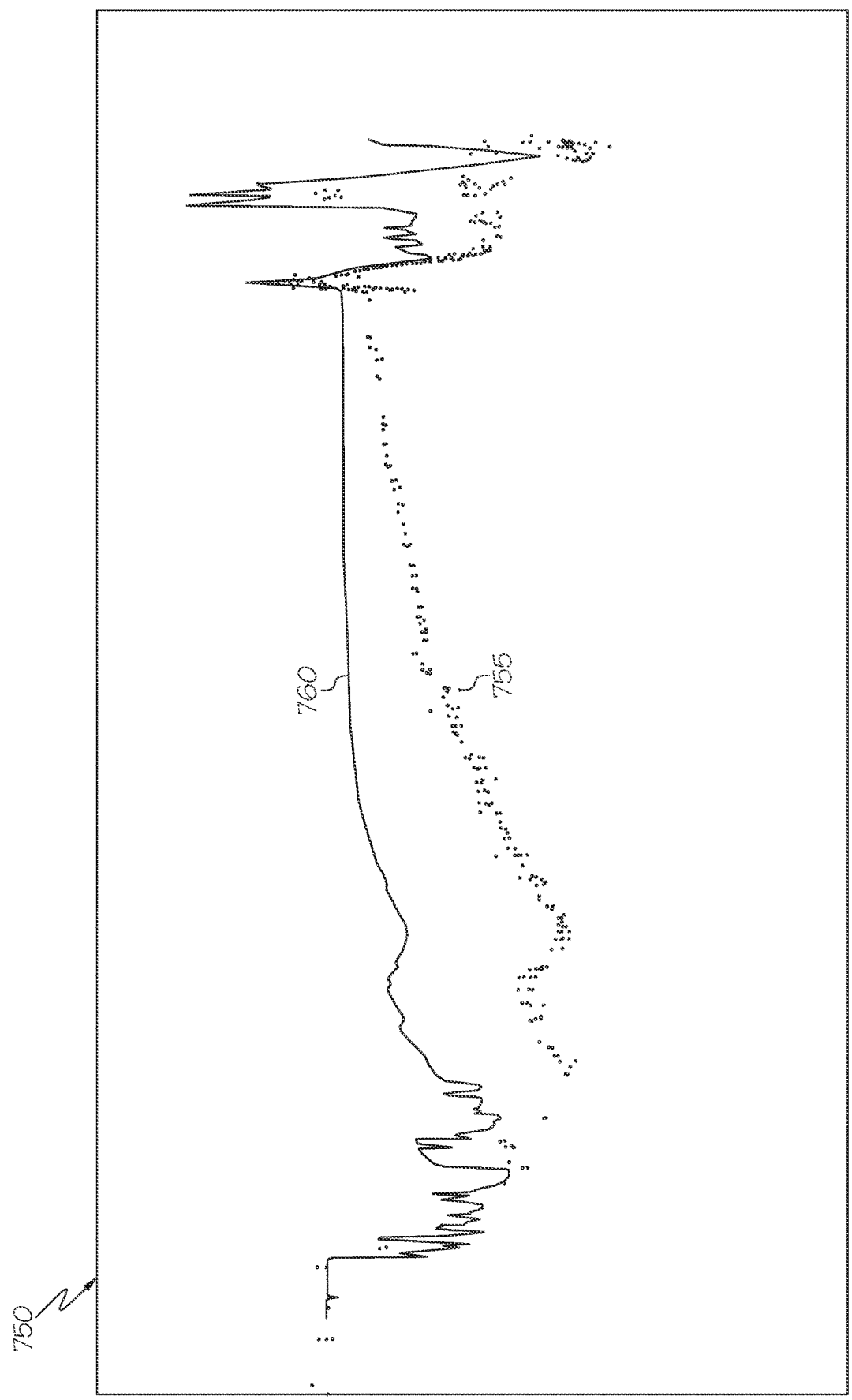

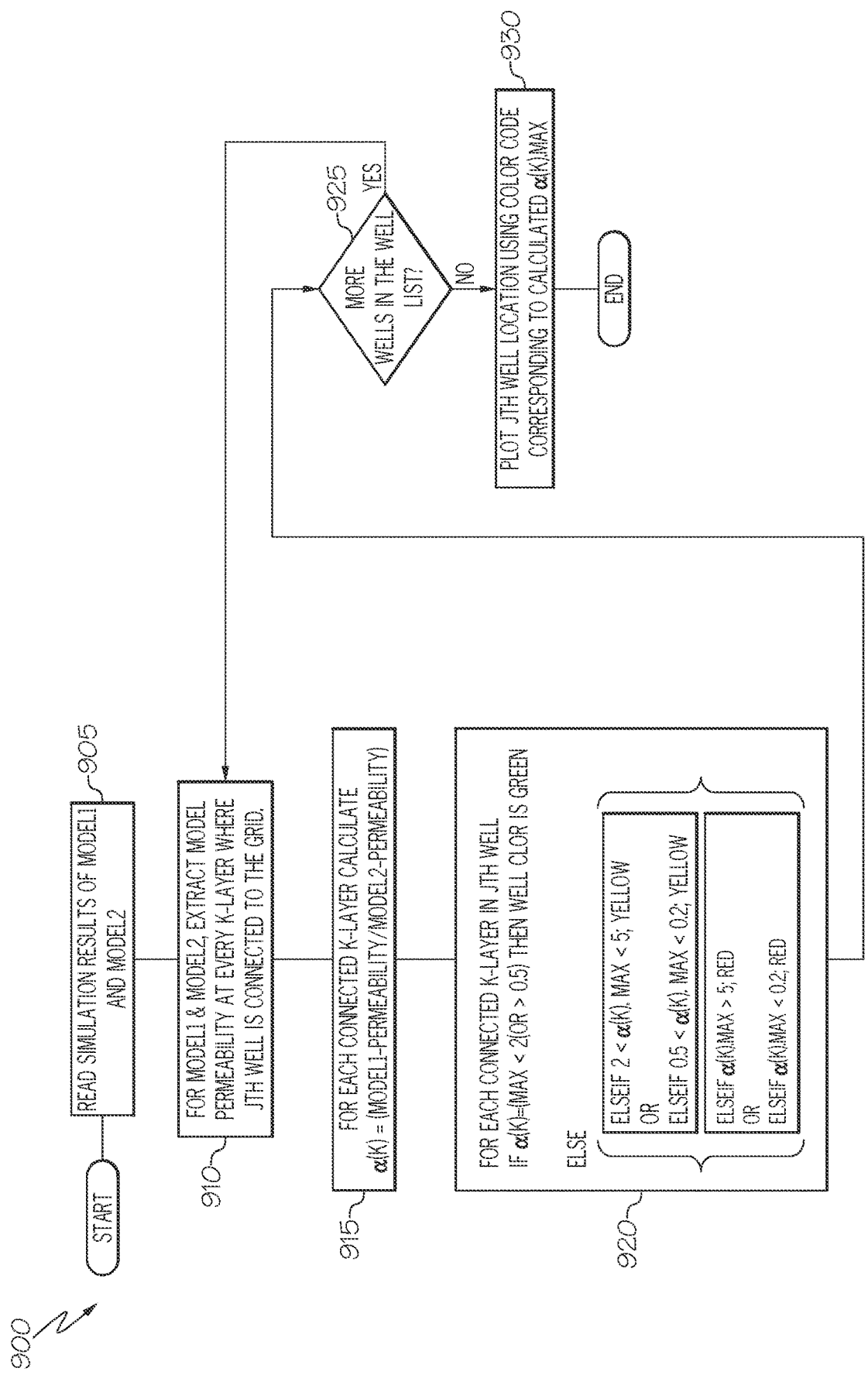

SYSTEMS AND METHODS FOR RESERVOIR HISTORY MATCHING QUALITY ASSESSMENT AND VISUALIZATION

CROSS-REFERENCE TO RELATED APPLICATIONS

This application claims the benefit of U.S. Provisional Application Serial Nos. 63/054,031 entitled RESERVOIR HISTORY MATCHING QUALITY ASSESSMENT AND VISUALIZATION SYSTEMS AND METHODS THEREOF filed Jul. 21, 2020.

TECHNICAL FIELD

The present disclosure relates to assessing history-match quality of all wells in a field based on observed well dynamic data from the field.

BACKGROUND

History Matching is a key reservoir engineering practice that involves calibrating a geo-model to available well data. A plot of simulated data with the observed data on a well-by-well basis gives the indication of match-quality and by inference, the quality of dynamic model. Because of the large sizes of some fields with over 1000 wells in a field, checking the history-match quality through well-by-well visualization is a cumbersome task, which makes history matching slower. In addition, conventional processes for history matching analyze data separately and as a result can complicate and prolong history matching. In addition, well by well analysis provides limited data for a well field. Another drawback of conventional processes and systems for History Matching is that conventional methods do not allow for simultaneous analysis of depth dependent and time dependent measurements. There exists a need for improved processes and system for History Matching.

BRIEF SUMMARY

According to the subject matter of the present disclosure, systems and methods are provided for determining and presenting field view history-matched well quality data. A method is provided that includes receiving, by a device, well data for a plurality of wells in a well field, and performing, by the device, a plurality of functional operations using the well data and a model of the well field. According to embodiments, the plurality of functional operations include a trend operation configured to determine well groups using pattern recognition of well time lapse pressure trends based on the well data, wherein the trend operation is configured to identify at least one connected reservoir region (CRR), and a geo-probe integration operation configured to integrate data for each CRR and evaluate a three-dimensional (3D) static model for wells in of each CRR, wherein the geo-probe integration operation is configured to assess geo-model characterization of simulated well pressure. The plurality of functional operations include a history match advisor operation configured to generate a history match static model including a combined display of time dependent and depth dependent representation of the well data, and a spatio-temporal operation configured to generate a space and time visualization of the well data. the plurality of functional operations include a front operation configured to track simulated injected fluid front using the well data, and an insight operation configured to report static changes between the model of the well field and the history match static model. Performing each of the functional operations includes generating a visualization. The method also includes outputting, by the device, a history match advisor interface including visualizations for each of the plurality of functional operations, the history match advisor interface including a representation of the history match static model.

In one embodiment, well data for the plurality of wells is generated by downhole sensors in the well field, and wherein the well data includes dynamic well data for at least one of datum pressure, water-cut, gas to oil ratio (GOR), measurement of pressure with depth (MDT), well productivity and water production variation with depth (PLT), and well fractional water saturation variation with depth (PNL).

In one embodiment, the trend operation generates a time-lapse pressure plot display for the at least one CRR including seismic and geologic faults overlaid on a pressure group map display for all wells in the CRR.

In one embodiment, the geo-probe integration operation is configured to output a visualization to compare simulated pressures for all wells within a CRR and provide a reference for observed pressure data.

In one embodiment, the history match advisor operation is configured to display a plurality of history match parameters including match quality of simulated time-lapse datum pressure to observed datum pressure.

In one embodiment, the spatio-temporal operation is configured to generate a visualization including a graphical element representing history match quality for each well within a well plot.

In one embodiment, the front operation is configured to generate a spatial and time visualization of fluid front advance through well water-cut data.

In one embodiment, the insight operation is configured to generate a visualization of well results including a graphical element representing permeability for each well.

In one embodiment, the method also includes calibrating the model of the well field using at least one determination of the functional operations.

In one embodiment, the method also includes calibrating the model of the well field using time dependent and depth dependent parameters simultaneously.

In accordance with another embodiment of the present disclosure, a system is provided for determining and presenting field view history-matched well quality data. The system includes at least one receiver configured to receive well data for a plurality of wells in a well field, and at least one processor. The at least one processor is configured to perform a plurality of functional operations using the well data and a model of the well field. The plurality of functional operations include a trend operation configured to determine well groups using pattern recognition of well time lapse pressure trends based on the well data, wherein the trend operation is configured to identify at least one connected reservoir region (CRR), and a geo-probe integration operation configured to integrate data for each CRR and evaluate a three-dimensional (3D) static model for wells in of each CRR, wherein the geo-probe integration operation is configured to assess geo-model characterization of simulated well pressure. The plurality of functional operations also include a history match advisor operation configured to generate a history match static model including a combined display of time dependent and depth dependent representation of the well data, and a spatio-temporal operation configured to generate a space and time visualization of the well data. The plurality of functional operations also include a front operation configured to track simulated injected fluid front using the well data, and an insight operation configured to report static changes between the model of the well field and the history match static model. Performing each of the functional operations includes generating a visualization. The at least one processor is also configured to output, a history match advisor interface including visualizations for each of the plurality of functional operations, the history match advisor interface including a representation of the history match static model.

Although the concepts of the present disclosure are described herein with primary reference to history matching, it is contemplated that the concepts will enjoy applicability to any reservoir modeling. For example, and not by way of limitation, it is contemplated that the concepts of the present disclosure will enjoy applicability to geological simulation and modeling.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 4 is a screen shot depiction of a user interface screen which shows a Time-lapse pressure plot display for all wells completed in the same reservoir resulting from the set of data processing steps of FIG. 2A performed in a data processing system according to an embodiment of the disclosure.

FIG. 7B is a screen shot depiction of a user interface screen which shows a Comparison of geo-model connectivity with observed well connectivity within identified pressure groups for all wells in the same reservoir resulting from the set of data processing steps of FIG. 7A performed in a data processing system according to an embodiment of the disclosure.

FIG. 9A is a functional block diagram of a set of data processing steps performed in a data processing system for an Insight graphical user interface according to an embodiment of the disclosure.

DETAILED DESCRIPTION

Figure 1B:
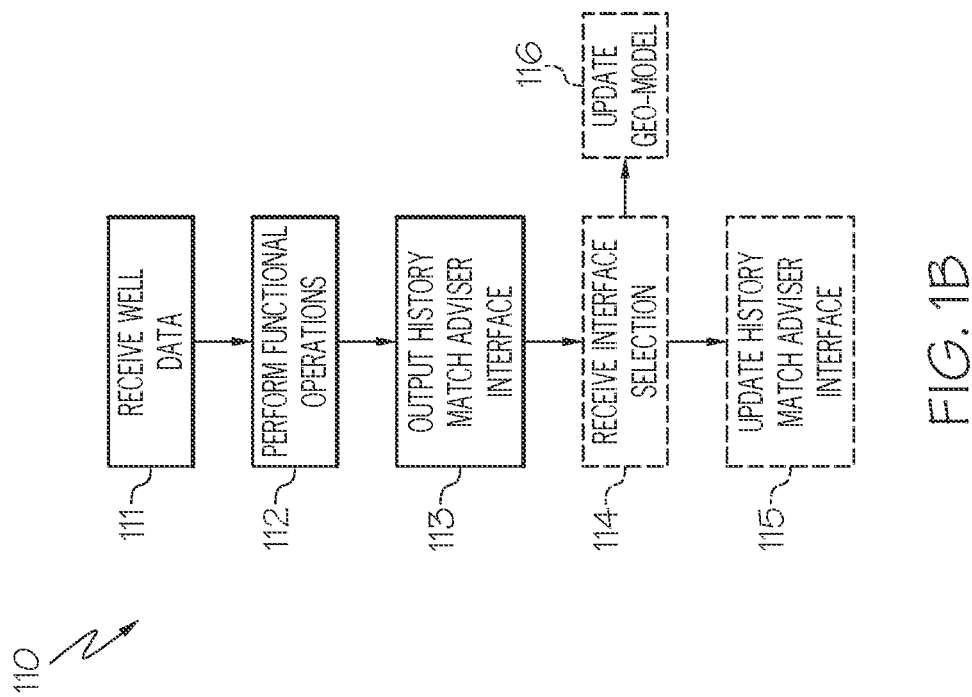
FIG. 1B illustrates a process for determining and presenting field view history-matched well quality data according to embodiments.

Embodiments of the present disclosure are directed to systems and methods for assessing history-match quality of wells in a field. Embodiments include methods for determining and presenting field view history-matched well quality data. According to embodiments, history matching includes adjusting a model of a reservoir, such as calibration of a geo-model, using available well dynamic data. Embodiments can also include use of spatio-temporal visualizations generated to assist with history matching. History matching can be performed to calibrate a model and account for past behavior of a reservoir such that historical production and pressures are matched as closely as possible in the model. The accuracy of the history matching may depend on the quality of the reservoir model and the quality and quantity of pressure and production data. By providing visualizations according to one or more operational functions, the ability of a geo-model to characterize wells and a well field may be assessed. According to embodiments, processes are provided to perform history matching in order to generate a model of wells in a field that simulates future reservoir behavior and output. Embodiments include operations performed using well data to generate visualizations of well behavior, model accuracy and output indications of modeling accuracy based on known geological properties in the reservoir. Processes are provided to simultaneously perform one or more operation functions and output visualizations.

Methods are also provided for assessing history-match quality of all wells in a field based on observed well dynamic data from the field, collecting and displaying field view history-matched well quality data, and providing simultaneous visualization of history-matching parameters for each well of a well field.

Embodiments are also directed to systems for collecting and displaying field view history-matched well quality data. Systems can include a device and/or at least one receiver configured to receive well data for a well field. Systems may include one or more downhole sensors to generate well data and a receiver configured to receive dynamic well data. According to embodiments, the system may be configured to provide simultaneous visualization of history-matching parameters for each well of a well field.

Systems and processes described herein can be performed by one or more devices including processors configured to receive and or utilize a geo-model for a well site. In addition to calibration of a geo-model for a site, device configurations may be configured to generate one or more visualizations to assist with evaluation of wells in a well region. In addition to visualizations, processes described herein may be configured to group wells and in turn identify connected reservoir regions (CRRs), perform history matching for the wells, and simultaneously display actual and simulated data for history matching a full reservoir field. Visualizations can include side-by-side and/or overlaid comparisons of actual and simulated data for history matching a full reservoir field using observed well dynamic data.

Systems and methods described herein can include performing functional operations on received well data including at least one of a trend operation, geo-probe integration operation, history match advisor operation, spatio-temporal operation, front operation and insight operation. The trend operation may group wells and determine wells groups using pattern recognition of well time lapse pressure trends based on well data. By grouping wells, at least one connected reservoir region (CRR) may be identified. A geo-probe integration operation can integrate data for a CRR and evaluate a three-dimensional (3D) static model for the plurality of wells in each CRR. The geo-probe integration operation can assess characterization of simulated well pressure by the geo-model. A history match advisor operation can generate a combined display of time dependent and depth dependent representation of well data and well measurement results. A spatio-temporal operation can generate a space and time visualization of well data. A front operation can track simulated injected fluid front and check consistency with measured data. An insight operation can report static changes between an original static model and a history match static model. Each of the functional operations includes generating a visualization that may be output as part of a history match advisor interface.

Processes and configurations described herein provide several advantages. Unlike conventional processes that are limited in perform single well comparisons, processes and systems can provide history matching based on well data for a well field and for connected reservoir regions. As such, the time required for history matching can be improved. Another benefit of processes and systems described herein is simultaneous analysis of depth dependent and time dependent measurements.

The follow terms used herein have the following meaning. Datum pressure is the stabilized pressure recorded in a shut-in well corrected to a reference depth. Water-cut is the percentage of water to total liquid produced by a well. GOR is a well's produced Gas to Oil ratio. MDT is a measurement of pressure with depth usually at the time of drilling a well. PLT is a wells productivity/water production variation with depth. PNL is a well's fractional water saturation variation with depth.

It is against the above-mentioned background that the present disclosure discusses a system and method for displaying history-match quality for all wells in a field-level view, thereby speeding up the history matching process when implemented, for example, as a set of processor steps performed according to the methodology of the present disclosure on hardware of a data processing system.

Figure 1A:
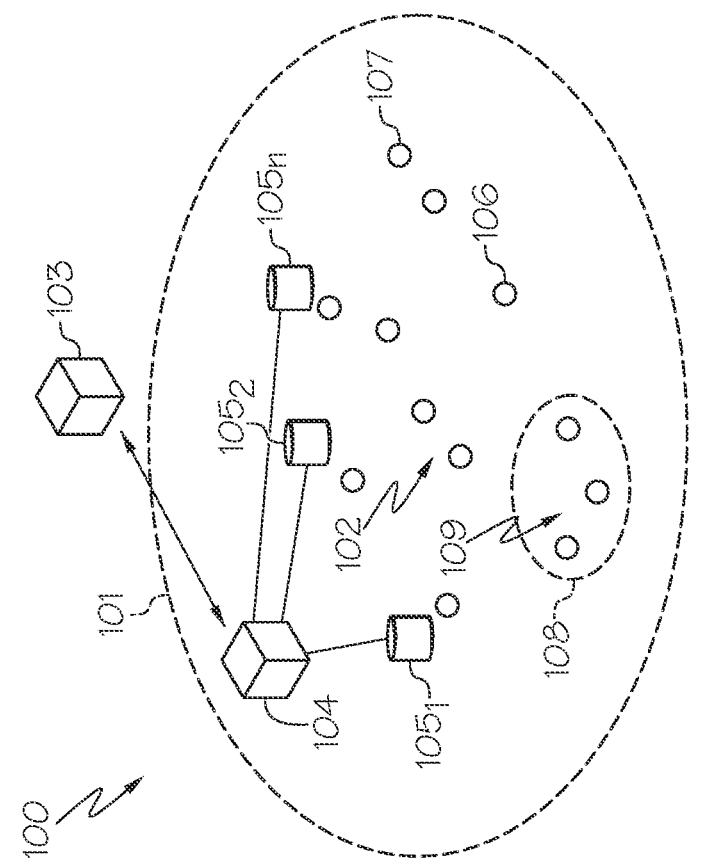
FIG. 1A illustrates an example system and an example well field and a graphical representation of a connected reservoir region (CRR) according to embodiments.

Referring initially to FIG. 1A, a graphical representation is shown of an example system and an example well field. According to embodiments, system 100 may be configured to collect and display field view history-matched well quality data for a well field 101 having a plurality of wells 102. System 100 may include device 103, receiver 104, and downhole sensors 105$_{1-n}$. Device 103 may be a well quality data interface unit, such as a computer, laptop, of mobile device having a user interface to present data and receive user input. Receiver 104 can collect and organize data from the wells. Downhole sensors 105$_{1-n}$ may be configured to detect dynamic well data for wells 102. System 100 may include a downhole sensor, such as downhole sensors 105$_{1-n}$, for each of wells 102. Device 103 may be configured to receive well data from receiver 104 and to determine and assess history match quality using one or more processes and operations described herein. As described herein history match quality determinations may include ratings of wells and/or regions, such as good, acceptable and poor, based on the ability of a geo-model to characterize a well. In addition, a user interface as described herein may present graphical elements to indicate the history match quality determinations.

FIG. 1A illustrates an example system and an example well field and a graphical representation of a connected reservoir region (CRR) according to embodiments. According to embodiments, system 100 and device 103 may be configured to perform history matching of well data for a well field including a first well, such as well 106, and a second well, such as well 107. Device 103 may be configured to receive dynamic well data for wells 102 and to identify CRR 108 including a plurality of wells 109. History matching and geo model data for CRR 108 may be used to assess wells within CRR 108. According to other embodiments, history matching and geo model data for CRR 108 may be used to evaluate wells and/or well data of other wells, such as one of more of well 106 and well 107. As described herein, evaluations of wells 102 may be used to generate visualizations wherein graphical elements may be determined for each well, such as a color code, display indicator and/or graphic to characterize wells. FIG. 1F illustrates visualizations for a well field according to embodiments.

As described herein, device 103 may be configured to perform one or more functional operations using well data and a model of the well field. In addition, device 103 may be configured to determine and present visualizations for history-matched well quality data. System 100 and device 103 may be configured to perform one or more of the processes described herein. As such, system 100 can collect and display field view history-matched well quality data. System 100 can also assess history-match quality of all wells in a field based on observed well dynamic data from the field. System 100 can also providing simultaneous visualization of history-matching parameters for each well of a well field.

FIG. 1B illustrates a process for determining and presenting field view history-matched well quality data according to embodiments. According to embodiments, process 110 may be performed for history matching. By way of example, process 110 may assess history-match quality of all wells in a field based on observed well dynamic data from the field. According to another example, process 110 may collect and display field view history-matched well quality data. According to yet another example, process 110 may provide simultaneous visualization of history-matching parameters for each well of a well field. Process 110 may be performed by device including a processor as discussed below with reference to FIG. 1C.

Process 110 includes receiving well data for a plurality of wells of a well field at block 111. At block 111, the device may also receive model data for at least one well of the plurality of wells and the well field. Well data received may be for a wells in a particular area or region of the field. Well data for the plurality of wells may be dynamic data generated by downhole sensors in the well field. According to embodiments, the well data includes dynamic well data for at least one of datum pressure, water-cut, gas to oil ratio (GOR), measurement of pressure with depth (MDT), well productivity and water production variation with depth (PLT), and well fractional water saturation variation with depth (PNL).

Process 110 includes performing functional operations at block 112. According to embodiments, a plurality of functional operations may be performed using the well data and a model of the well field. According to embodiments, the plurality of functional operations include a trend operation, a geo-probe integration operation, history match advisor operation, a spatio-temporal operation, a front operation and an insight operation. Performing each of the functional operations includes generating a visualization. The functional operations may be performed to calibrate a model of the well field using time dependent and depth dependent parameters simultaneously.

According to embodiments, a trend operation is configured to determine well groups using pattern recognition of well time lapse pressure trends based on the well data. Based on the well group determinations, the trend operation is configured to identify at least one connected reservoir region (CRR). The trend operation may also generate a time-lapse pressure plot display for the at least one CRR including seismic and geologic faults overlaid on a pressure group map display for all wells in the CRR.

According to embodiments, a geo-probe integration operation configured to integrate data for each CRR and evaluate a three-dimensional (3D) static model for wells in of each CRR. The geo-probe integration operation is configured to assess geo-model characterization of simulated well pressure. The geo-probe integration operation may also output a visualization to compare simulated pressures for all wells within a CRR and provide a reference for observed pressure data.

According to embodiments, a history match advisor operation is configured to generate a history match static model including a combined display of time dependent and depth dependent representation of the well data. The history match advisor operation may also be configured to display a plurality of history match parameters including match quality of simulated time-lapse datum pressure to observed datum pressure.

According to embodiments, a spatio-temporal operation configured to generate a space and time visualization of the well data. The spatio-temporal operation may be configured to generate a visualization including a graphical element representing history match quality for each well within a well plot.

According to embodiments, a front operation is configured to track simulated injected fluid front using the well data. The front operation may generate a spatial and time visualization of fluid front advance through well water-cut data. The front module can compare observed water-cut with simulated water-cut in order to have a global perspective of whether or not the simulation model follows the observed flood front advance.

According to embodiments, an insight operation configured to report static changes between the model of the well field and the history match static model. The insight operation is configured to generate a visualization of well results including a graphical element representing permeability for each well.

At block 113, process 110 includes outputting a history match advisor interface. The history match advisor interface may include visualizations for each of the plurality of functional operations, the history match advisor interface including a representation of the history match static model. FIG. 1D illustrates an example history match advisor interface including representations for well data like datum pressure, water-cut, GOR, MDT, PLT, PNL, etc. According to embodiments, visualizations of the history match interface may be selected to aid in history matching. By providing output of multiple functional operations in an interface, the process for history matching is improved. In addition, the interface can provide a field level view of history match quality of each well in a field. Process 110 may also include calibrating the model of the well field using at least one determination of the functional operations at block 113. Process 110 may also calibrate a geo-model using time dependent and depth dependent parameters simultaneously at block 113 based on the functional operations performed in block 112.

Process 110 may optionally include receiving an interface selection at block 114. The interface selection may be of one or more visualizations. In embodiments, the interface selection may generate enlarged views of visualizations. In other embodiments, the interface selection may include adjustments to a geo model to match dynamic well data. As such, process 110 may optionally update a history match advisor interface at lock 115 in response to an interface selection at block 114. According to embodiments, process 110 may optionally update a geo-model at block 116 in response to an interface selection at block 114.

Figure 1C:
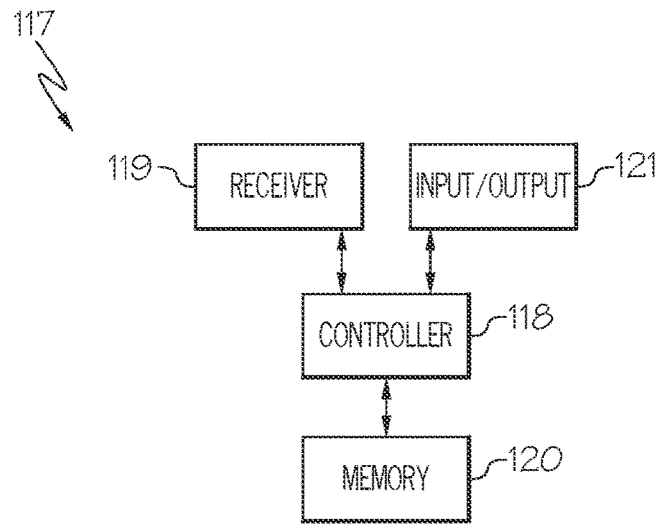
FIG. 1C illustrates an example representation of a device determining and presenting field view history-matched well quality data according to embodiments.
Figure 1D:
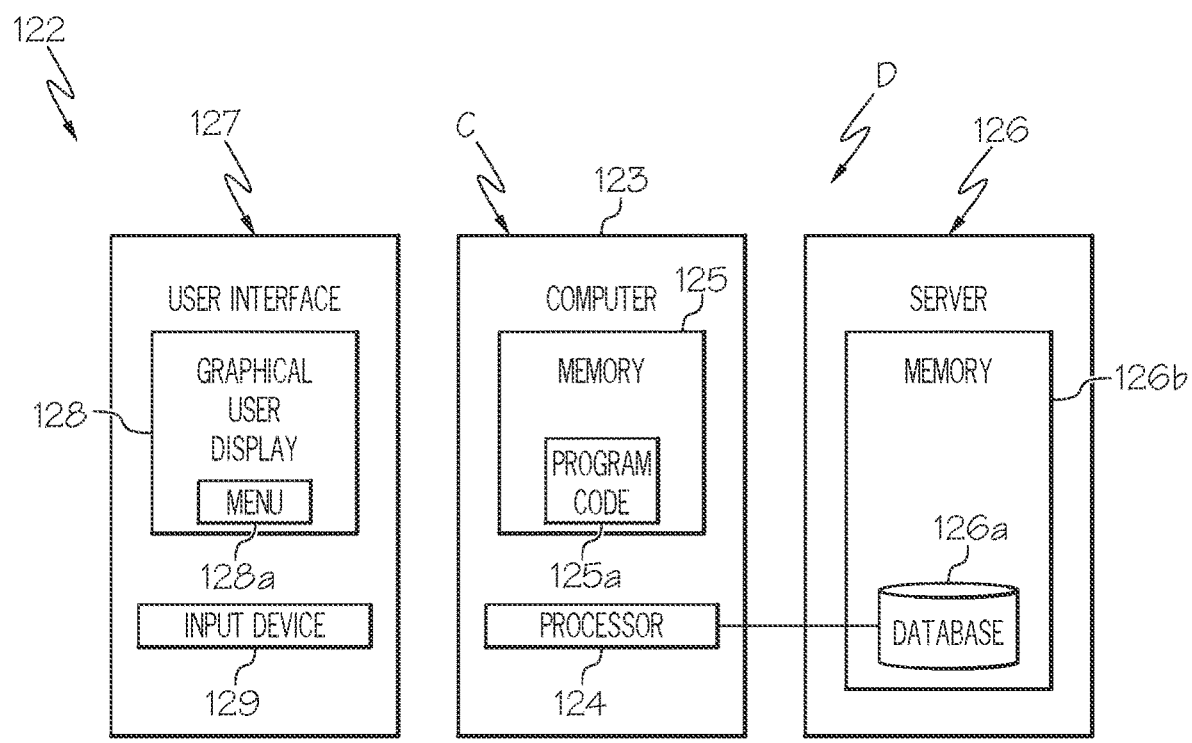
FIG. 1D is a schematic block diagram of a data processing system for simultaneous visualization for all history-matching parameters for each well in a field using real time data from sensors and downhole gauges of subsurface earth formations.

FIG. 1C illustrates an example representation of a device determining and presenting field view history-matched well quality data according to embodiments. According to one embodiment, device 117 may relate to a device (e.g., device 103) configured to receive well data from receiver 119. Device 117 may be part of a system, such as system 100 of FIG. 1A. Device 117 may be configured to receive well data for a plurality of wells in a well field. According to one or more embodiments, device 117 includes controller 118, receiver 119, memory 120 and input/output block 121.

Controller 118 may be to a processor or control device configured to execute one or more operations stored in memory 120, such as processes for functional operations. Controller 118 may be configured to perform one or more processes herein including process 110 of FIG. 1B. According to embodiments, controller 118 may be a history matching processor.

Controller 118 may be coupled to memory 120, I/O 121 and receiver 119. Controller 118 may be configured to control operations based on one or more inputs from I/O block 121. Device 118 may output a history match advisor interface data by way of I/O block 121.

FIG. 1D is a schematic block diagram of a data processing system for simultaneous visualization for all history-matching parameters for each well in a field using real time data from sensors and downhole gauges of subsurface earth formations. According to embodiments, system 122 may perform processes described herein, such as process 110 of FIG. 1B. System 122 may include a device to perform functional operations, such as device 117 of FIG. 1C.

As depicted by FIG. 1D, system 122 may include a computer (C) 123 having a processor 124 and memory 125 coupled to the processor 124 to store operating instructions, control information and database records therein. The data processing system (D) 126 can be a computer of any conventional type of suitable processing capacity, such as a mainframe, a personal computer, laptop computer, or any other suitable processing apparatus. It should thus be understood that a number of commercially available data processing systems and types of computers may be used for this purpose.

The computer 123 has a user interface 127 and an output data display 128 for displaying a field-level view of history-match quality of all wells in a field using available observed well dynamic data like datum pressure, water-cut, GOR, MDT, PLT, and PNL as input parameters. Other examples of such input parameters, features and configurations of each well in the field may include oil production rate; gas production rate; water production rate; wellbore deviation; region permeability; region average porosity; well perforations; distance from oil-water contact depth in reservoir; distance from water-gas contact depth in reservoir; distance from gas-oil contact depth in the reservoir and distance from free water table in the reservoir. It should be understood that other input parameters, features and configurations of each well in the field may also be provided.

Figure 10:
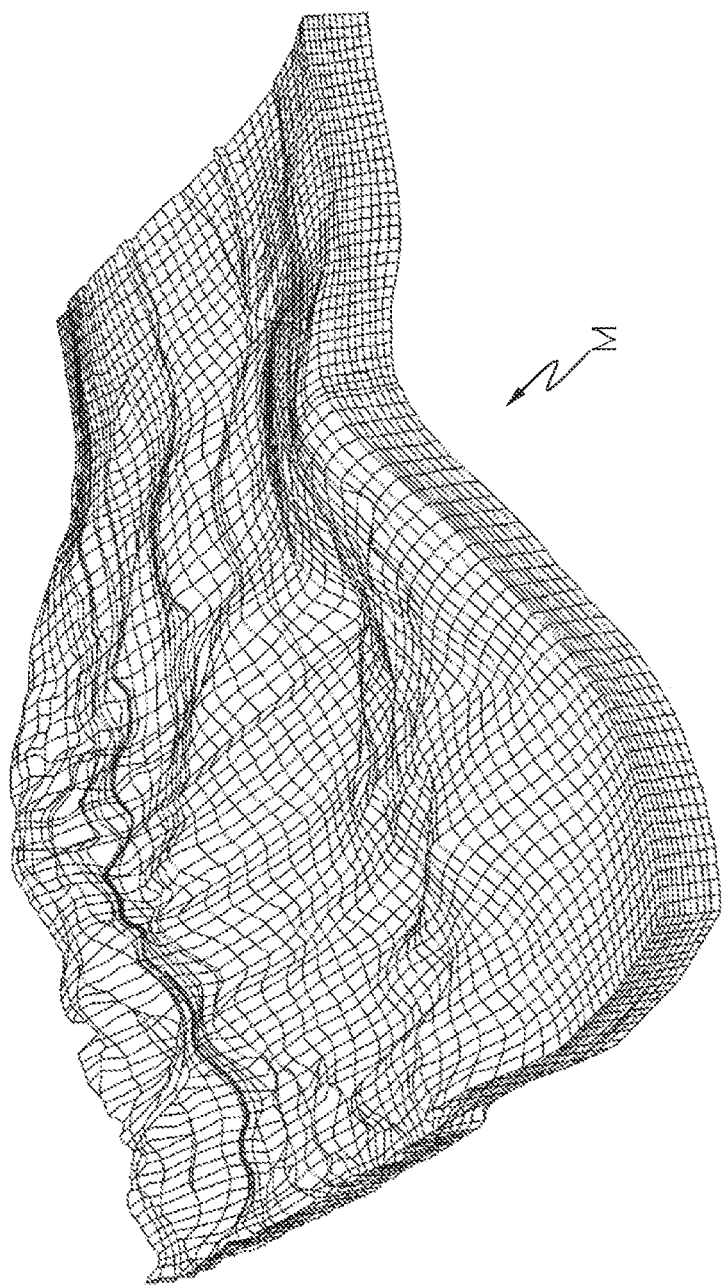
FIG. 10 is a schematic diagram of a dynamic model of a subsurface hydrocarbon reservoir according to prior art.

It is to be appreciated that the displayed field level view is a plot of simulated data with the observed well dynamic data on a well-by-well basis to provide an indication of history match-quality and by inference, the quality of an associated dynamic model M, such as depicted by FIG. 10 and also disclosed and shown in U.S. Pat. No. 9,896,830, owned by the assignee of the present disclosure and which disclosed is incorporated fully herein by reference. The output display 128 includes components such as a printer and an output display screen capable of providing printed output information or visible displays in the form of graphs, data sheets, graphical images, data plots and the like as output records or images and may present menu 128a.

The user interface 127 of computer 123 also includes a suitable user input device or input/output control unit 129 to provide a user access to control or access information and database records and operate the computer 123. Data processing system 126 further includes a database 126a stored in computer memory, which may be internal memory 126b, or an external, networked, or non-networked memory in an associated database server.

The data processing system 126 includes program code 125a stored in non-transitory form in memory 125 of the computer 123. The program code 125a according to the present disclosure is in the form of non-transitory computer operable instructions causing the data processor 124 to perform the computer implemented method of the present disclosure in the manner described above and illustrated in FIGS. 1A-9B, and 12.

It should be noted that program code 125a may be in the form of microcode, programs, routines, or symbolic computer operable languages that provide a specific set of ordered operations that control the functioning of the data processing system 126 and direct its operation. The instructions of program code 125a may be stored in non-transitory form in memory 125 of the computer 123, or on computer diskette, magnetic tape, conventional hard disk drive, electronic read-only memory, optical storage device, or other appropriate non-transitory data storage device having a computer usable medium stored thereon. Program code 125a may also be contained on a data storage device such as a server as a non-transitory computer readable medium.

As disclosed in U.S. Pat. No. 9,896,830, FIG. 10 is a simplified model M of a portion of a subsurface hydrocarbon reservoir for which production results based on operating conditions and parameters are simulated over an estimated production life. The estimated production life is based on geological and fluid characterization information obtained for the wells of the reservoir, which wells when grouped together form a field. The results obtained are thus available and used for simulation of historical performance and for forecasting of production from the reservoir. Based on the results of such simulation, models such as those described and shown in U.S. Pat. No. 7,526,418 are then formed and are available for evaluation and analysis. U.S. Pat. No. 7,526,418 is owned by the assignee of the present disclosure and is incorporated herein by reference.

For a giant reservoir, the physical size of the reservoir may be several miles in length, breadth and depth in its extent beneath the earth and might, for example, have a volume or size on the order of three hundred billion cubic feet. For reservoirs of this type, the actual number of wells in a field may also be on the order of a thousand, with each well having a number of perforations into producing formations.

Figure 11:
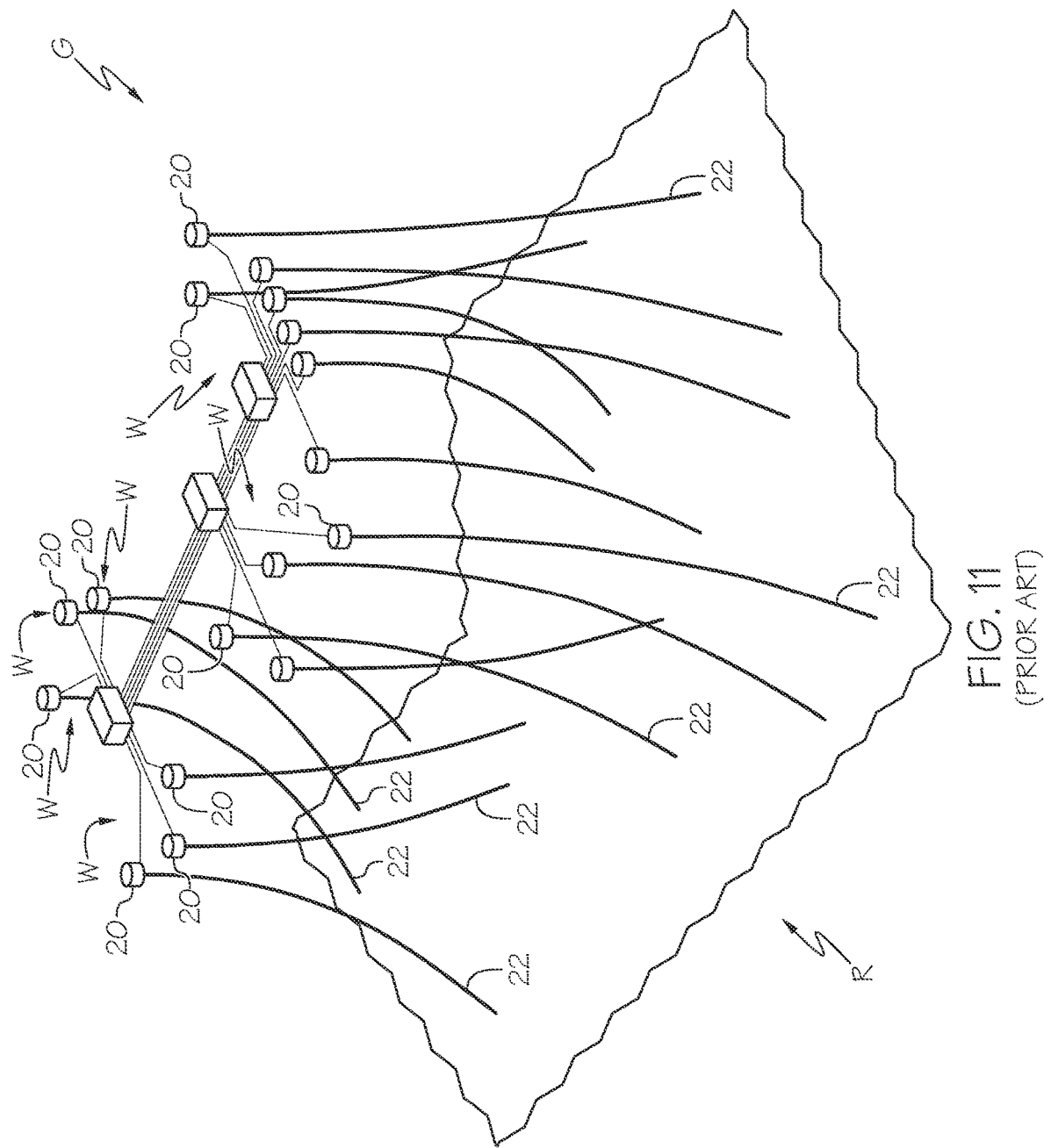
FIG. 11 is a schematic diagram showing a pressure downhole measuring system according to prior art.

FIG. 11 illustrates a prior art example placement of a group G of wells W in a field F from a portion of a large reservoir R of the type and size exemplified by the model M of FIG. 10. A field F typically has a plurality of such groups G, indicated by the color coding in these figure for Group 1-Group 6, and gp 0-gp 10, respectively. The wells in each group G typically include production wells, injection wells and observation wells and are spaced over the extent of the reservoir. As indicated, certain ones of the wells W represented by each group G are provided with permanent downhole measurement systems 20, which are known as PDHMS. The PDHMS 20 may, for example be of the type described in U.S. Pat. Nos. 8,078,328 and 8,312,320, commonly owned by the assignee of the present application. The subject matter disclosed in U.S. Pat. Nos. 8,078,328 and 8,312,320 is fully incorporated herein by reference.

The PDHMS 20 include surface units which receive reservoir and well data in real time from downhole sensors 22. The downhole sensors 22 obtain data of interest, and for the purposes of the present disclosure the downhole sensors include the previously mentioned available observed well dynamic data for all groups G of wells W in the reservoir field F. The downhole sensors 22 furnish the available observed well dynamic data, collected in real-time, from the wells W, and a supervisory control and data acquisition (SCADA) system with a host computer or data processing system D (FIG. 10) collects and organizes the collected data form the wells in their respective group G.

Figures 1, 1E:
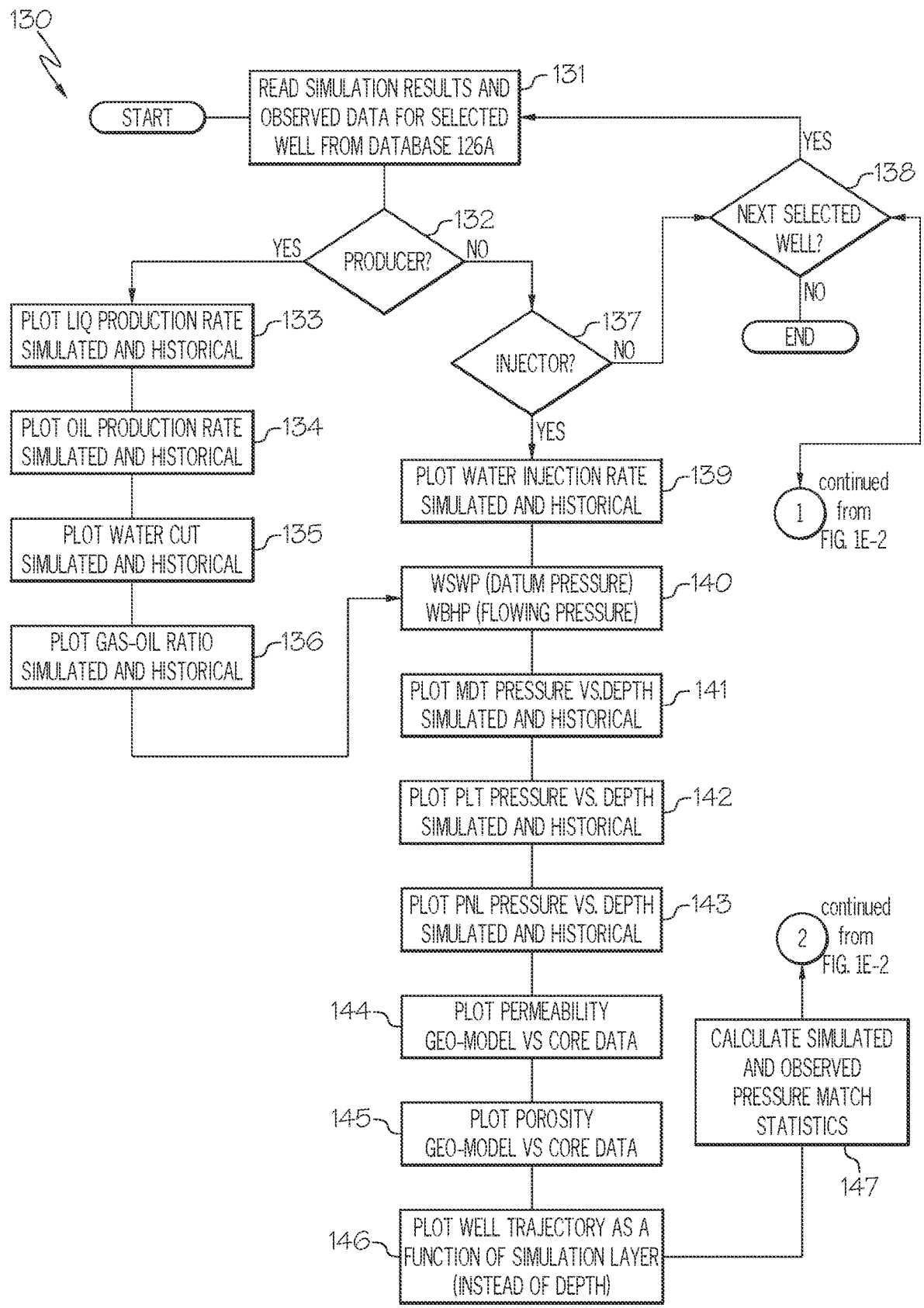
FIG. 1E, presented on multiple drawings sheets as FIG. 1E-1 and FIG. 1E-2, is a functional block diagram of a set of data processing steps performed in a data processing system for displaying a field-level view of history-match quality of all wells in a field using available observed well dynamic data.
Figures 1, 1E, 2:
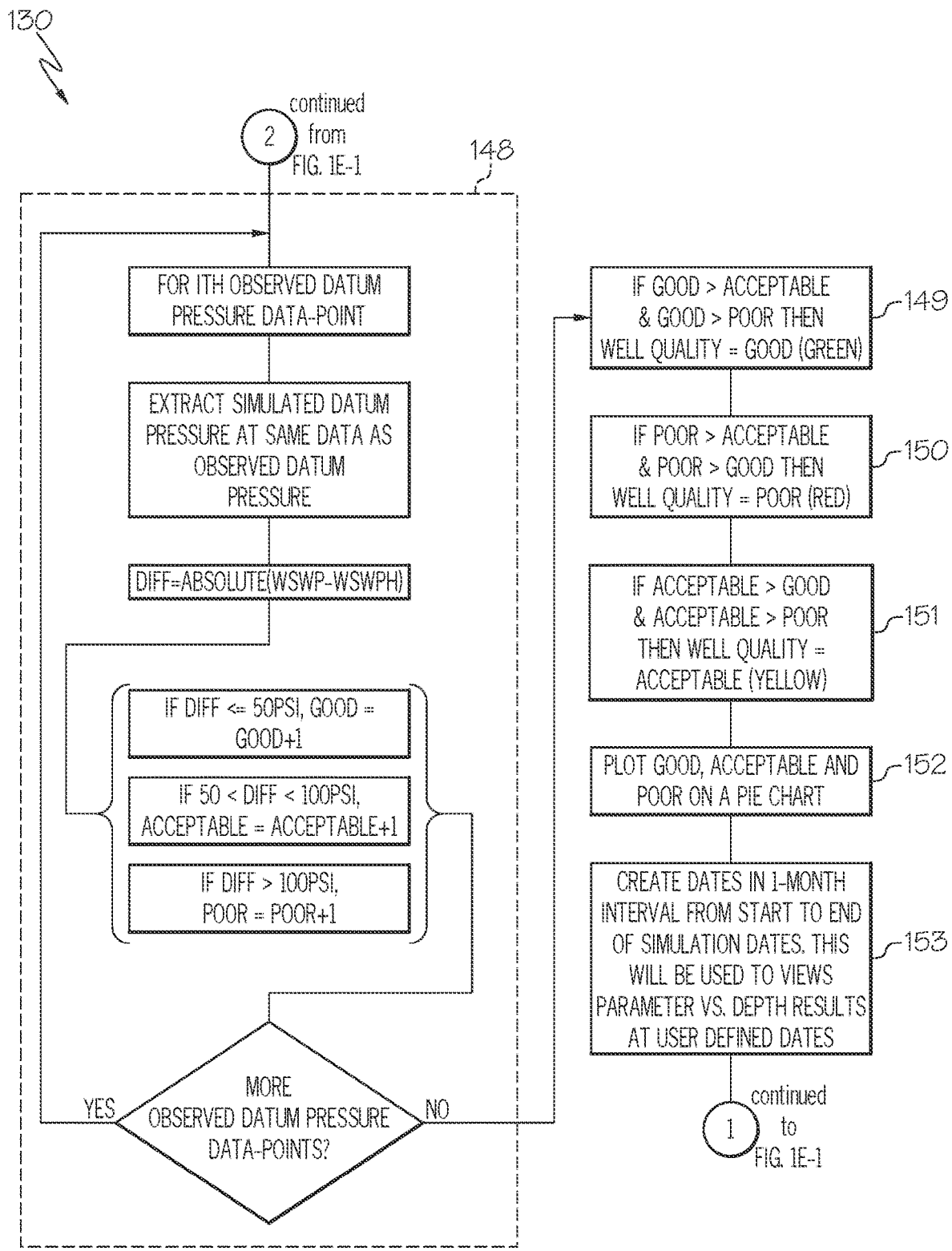
Figure 1F:
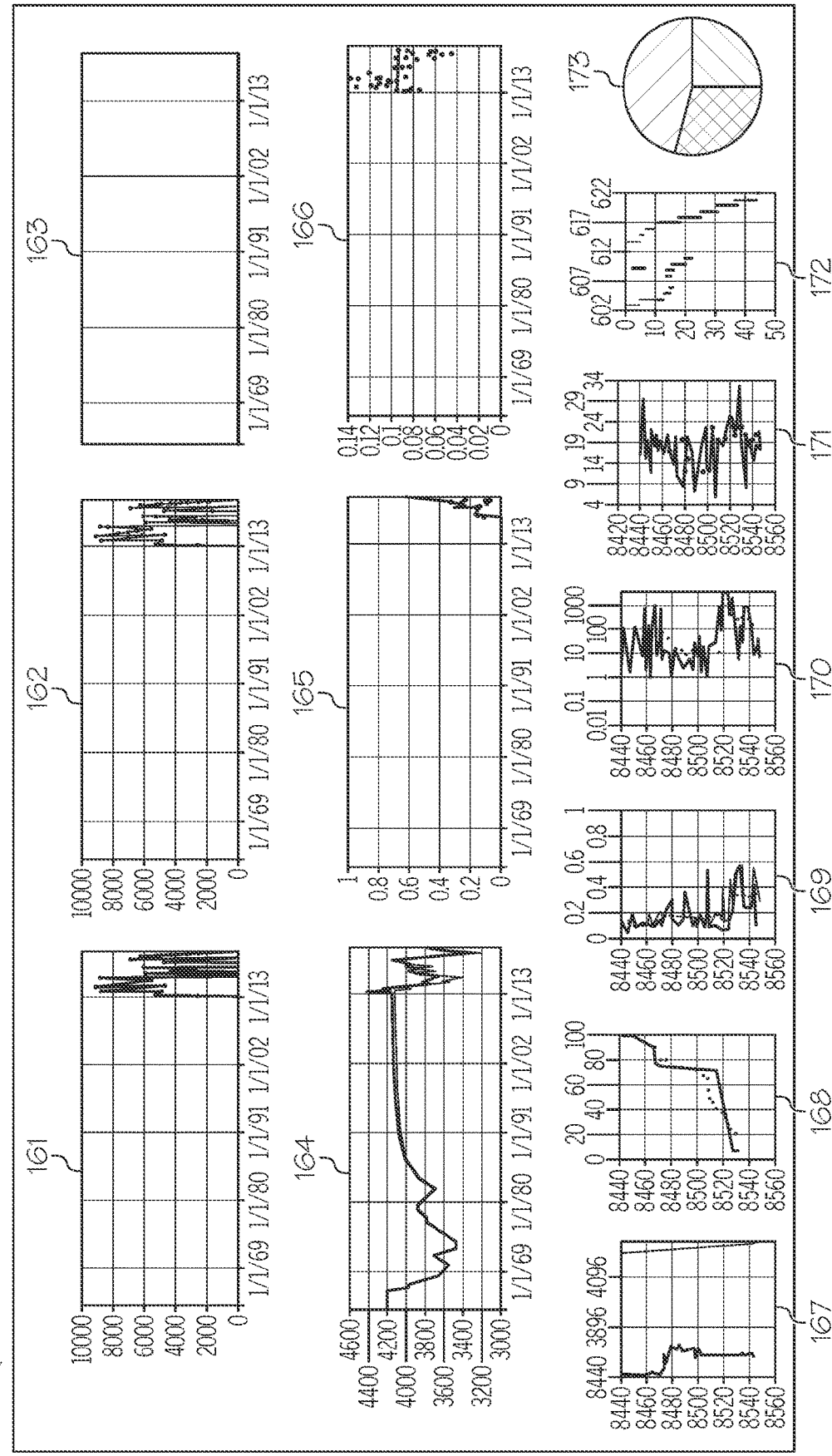
FIG. 1F is a graphical representation of a History Match Advisor interface showing the results of the set of data processing steps of FIG. 1A performed in a data processing system according to embodiments.

FIG. 1E, presented on multiple drawings sheets as FIG. 1E-1 and FIG. 1E-2, is a functional block diagram of a set of data processing steps performed in a data processing system for displaying a field-level view of history-match quality of all wells in a field using available observed well dynamic data from the field like datum pressure, water-cut, GOR, MDT, PLT, PNL, and the likes according to the present disclosure.

With the collected observed well dynamic data, functional modules of the system as described herein (e.g., system 100, system 126, etc.) implemented according to the hereinafter disclosed data processing steps provide better visualization and faster integration of well data to help speed up reservoir understanding, characterization and calibration (history matching). According to embodiments, six main functional modules are provided, which are elaborated in more details subsequently. These functional modules are as follows:

History Match Advisor: Combined display of time dependent and depth dependent well results for improved reservoir understanding which would aid simultaneous calibration (history matching) of all parameters.

Spatio-Temporal Viz: This provides a visualization of well results in space and time, this helps to cross-check each well's result consistency or not with its neighbors thereby offering a high level data/results quality check.

Trend: Data Analytics module that uses pattern recognition to automatically group wells based on time-lapse pressure trends to create Connected Reservoir Regions CRR which helps understanding of fault status and rock quality.

Geo-probe: Integration of CRR for providing quick feedback for 3D static model quality in order to improve geo-model characterization.

Front: This module provides a tracking of injected fluid front in simulation, and checks its consistency or not with measured data Insight: This is a 2.5D peer or management review module that reports the static model changes between original static model and history-matched static model.

Each of the above noted modules may be listed and reached, e.g., directly from a menu displayed on the graphical user interface 127. A user can use, e.g., the input device 128 to select and have the processor run (start) the associated processor steps detailed hereinafter for the selected module in order to present information in the particular manner of an associated graphical user interface also detailed hereinafter.

History Match Advisor Module

Current practice of history matching (HM) of observed well data is usually done in a sequential fashion. Engineers finish the HM of datum pressure before beginning HM of MDT because the visualization templates for these data are different (datum pressure is pressure vs. time plot, while MDT is pressure vs. depth plot). The same way, engineers finish water-cut match before visiting the PLT and PNL match because the visualization templates for these are different (water-cut is % water-production vs. time, PLT productivity profile vs. depth and PNL is % water-saturation vs. depth). In existing visualization tools (e.g., Eclipse-Office by Shlumberger, Tempest View by Roxar), these simulation outputs are stored in different folders. Engineers therefore focus on history-matching one type of data per time. Going to check each well result in the different output folders could be very tasking and distracting.

An identified problems of previous processes is that while modifications were being made to match datum pressure, attention is not being paid to the impact of these modifications on water-cut match, so by the time datum pressure match is completed, the modifications that would be required in order to HM water-cut may mess-up the datum pressure match already achieved. Iterations would then have to be made to attain compromises that allow satisfactory match of both datum pressure and water-cut. Now imagine by the time datum pressure and water-cut are matched, the modifications that would be required to history match MDT pressure may mess-up the datum pressure and water-cut matches already achieved, iterations would again be necessary to ensure compromise modifications that would allow to match the three sets of data. For a reservoir containing few wells, such back-and-forth could be manageable, but for a reservoir with several hundreds of wells, it could be really cumbersome.

Turning to FIG. 1E, a flow chart displays a set of processor steps and a process that can be implemented by a device and/or as program code 125*a* in memory 125 (and/or memory 126*b*) and performed by processor 124 in a data processing system 126 (FIG. 1D) which can result in determining a field-level view of history-match quality of all wells W in a field F (FIG. 6) using simulated well results and available observed well dynamic data read by the processor 124 from database 126*a* for each well W from the field according to the present disclosure. FIG. 1E and the other flow charts depicted by the figures and disclosed herein indicate the basic computer processing sequences of the present disclosure and the computation taking place in the data processing system 126 for a history-match quality determination according to the present disclosure. Output of the processor steps carried out by the processor 124 in the flow charts are illustrated as the various screen shot depictions of graphical user interfaces (e.g., which permits further parameter, well, and/or field selection and/or adjustment of displayed data and/or resulting content viewed), which are displayed by the processor 124 on graphical user display 128 disclosed herein.

FIG. 1E illustrates process 130 which may be initiated by read simulation results and observed data for selected well from database 126 at block 131. Process 130 may characterize and analyze wells as producers or injectors. If the well is characterized as a producer at block 132, process 130 includes plotting liquid production rate for simulated and historical data at block 133, plotting oil production rate for simulated and historical data at block 134, plotting water cut for simulated and historical data at block 135, and plotting gas-oil for simulated and historical data at block 136. At block 137, process 130 determines if a well is an injector and water injection rate is plotted simulated and historical data at block 139. At block 140, datum pressure and flowing pressure is determined. Process 130 includes plotting MDT pressure vs. depth for simulated and historical data at block 141, plotting PLT pressure vs. depth for simulated and historical data at block 142, plotting PNL pressure vs. depth for simulated and historical data at block 143, plotting permeability for simulated and historical data at block 144, plotting porosity at block 145, and plotting well trajectory at block 146. At block 147, simulated and observed pressure match statistics may be calculated. At block 138, a next well may be selected.

At block 148, for each data point simulated datum pressure may be extracted at the same data as observed datum pressure to assess simulated data compared to dynamic data. Datum pressure match quality, water-cut match quality, MDT match quality, and the like may be characterized at block 148. FIG. 2B illustrates graphical output including a pie chart showing the history match statistics for a given simulation run. Statistics can include how many wells have a good match (as explained in HMA section), how many wells have acceptable match, and how many wells have a poor match. The overall quality of the simulation run is that of the largest pie. In FIG. 2B, the simulation run has a poor quality, because majority of the wells have poor match quality. Well quality may be judged acceptable at block 149 if the model is acceptable, a well quality may be judged as poor at block 150 if the model is not acceptable. At block 151 well quality may be judged as acceptable if neither good nor poor. At block 152, well results may be plotted with graphical elements, such as in a pie chart to present good, acceptable and poor ratings. At block 153, dates may be created in 1-month intervals for viewing parameters.

FIG. 1F is a graphical representation of a History Match Advisor interface showing the results of the set of data processing steps, such as data processing steps of FIG. 1E performed in a data processing system according to an embodiment of the disclosure.

For example, FIG. 1B is a screen shot depiction which shows the results of the processing performed in FIG. 1A displayed in a History Match Advisor interface 160 according to an embodiment of the disclosure. In FIG. 1B, the following is seen in each labelled plot section. The History Match Advisor Interface displays all the HM parameters at once in a single view and with a single click resulting in Plots (a)-(m) labeled as 161-172, which are discussed hereafter.

Plot (a) 161 shows the match of well liquid production rate (both simulated and historical). Plot (b) 162 shows the match of well oil production rate (both simulated and historical). Plot (c) 163 shows the match of well water injection rate (both simulated and historical). The current well plotted is a producer, hence no record is plotted on the water injection chart. Plot (d) 164 shows the match of well static and flowing pressure (both simulated and historical). Plot (e) 165 shows the match of well water-cut (both simulated and historical). Plot (f) 166 shows the match of well GOR (both simulated and historical).

Plot (g) 167 shows the match of MDT (pressure vs. depth) wherein a user display could present data with graphical attributes described below with exemplary graphical attributes/colors, by way of example:
- a brown line may be used to show simulated MDT at initial conditions;
- a green line may be used to show simulated MDT at end of history match period;
- a red line may be used to show simulated MDT at date of measured MDT data; and
- black dots may be used to show measured MDT data.

Plot (h) 168 shows the match of PLT (% water-production vs. depth) wherein a user display could present data with graphical attributes described below with exemplary graphical attributes/colors, by way of example:
- a brown line may be used to show simulated PLT at well start-up;
- a green line may be used to show simulated PLT at well most recent production date;
- a red line may be used to show simulated PLT at date of measured PLT; and
- black dots may be used to show measured PLT data.

Plot (i) 169 shows the match of PNL (water-saturation vs. depth) wherein a user display could present data with graphical attributes described below with exemplary graphical attributes/colors, by way of example:
- a brown line may be used to show simulated PNL at initial conditions;
- a green line may be used to show simulated PNL at end of history match period;
- a red line may be used to show simulated PNL at date of measured PNL data; and
- black dots may be used to show measured PNL data.

Plot (j) 170 shows well permeability vs. depth profile (both core data and model data). Plot (k) 171 shows well porosity vs. depth profile (both core data and model data). Plot (l) 172 shows the reservoir zones where well has been perforated. Plot (m), pie chart 173 shows the statistical match quality of the simulated datum pressure and the observed datum pressure for selected well. Every well has a time-lapse datum pressure data measurement, and the simulator also calculates time-lapse datum pressure for every well. History-match quality indicator defines how closely the simulated pressure matches the measured pressure at a given measured pressure date. For example, if well-1 has 5 time-lapse datum pressure measurements at dates d1, d2, d3, d4 and d5. The visualizer extracts the simulated pressure data at those dates and if the absolute difference at any date is less than 50 psi it colors that date as green, if absolute difference is greater than 50 and less than 100, it colors that date yellow and if the absolute difference is greater than 100, it colors that red. The pie chart 173 shows the proportion of observed pressure dates where simulated pressure are good (<50), acceptable (51-100) and poor (>100). The final rating for the well is the rating with largest pie. In the current example, the well pressure match is poor.

In the well shown for illustration, the simulated well water-cut is higher than the observed data (Plot e 165), thus it can immediately seen from Plots (i) 169 and (h) 158 that this water is coming from depths below 8520 ftss. In addition, Plot (j) 170 indicates that the model permeability below this depth is too high compared with core data and model permeability above this depth is too low compared with core data. The History Match Advisor immediately shows that the permeability in the model below 8520 ftss should be reduced in order to improve the water-cut match. In order to improve the PLT match depicted by Plot (j) 170, for example, increasing the permeability between 8450-8500 should result in consistency with core data. No existing visualization tool brings together all these levels of details in order to permit an engineer to see clearly what needs to be adjusted in order to proceed simultaneously with all the HM parameters.

Spatio-Temporal Visualization Module

Figure 2A:
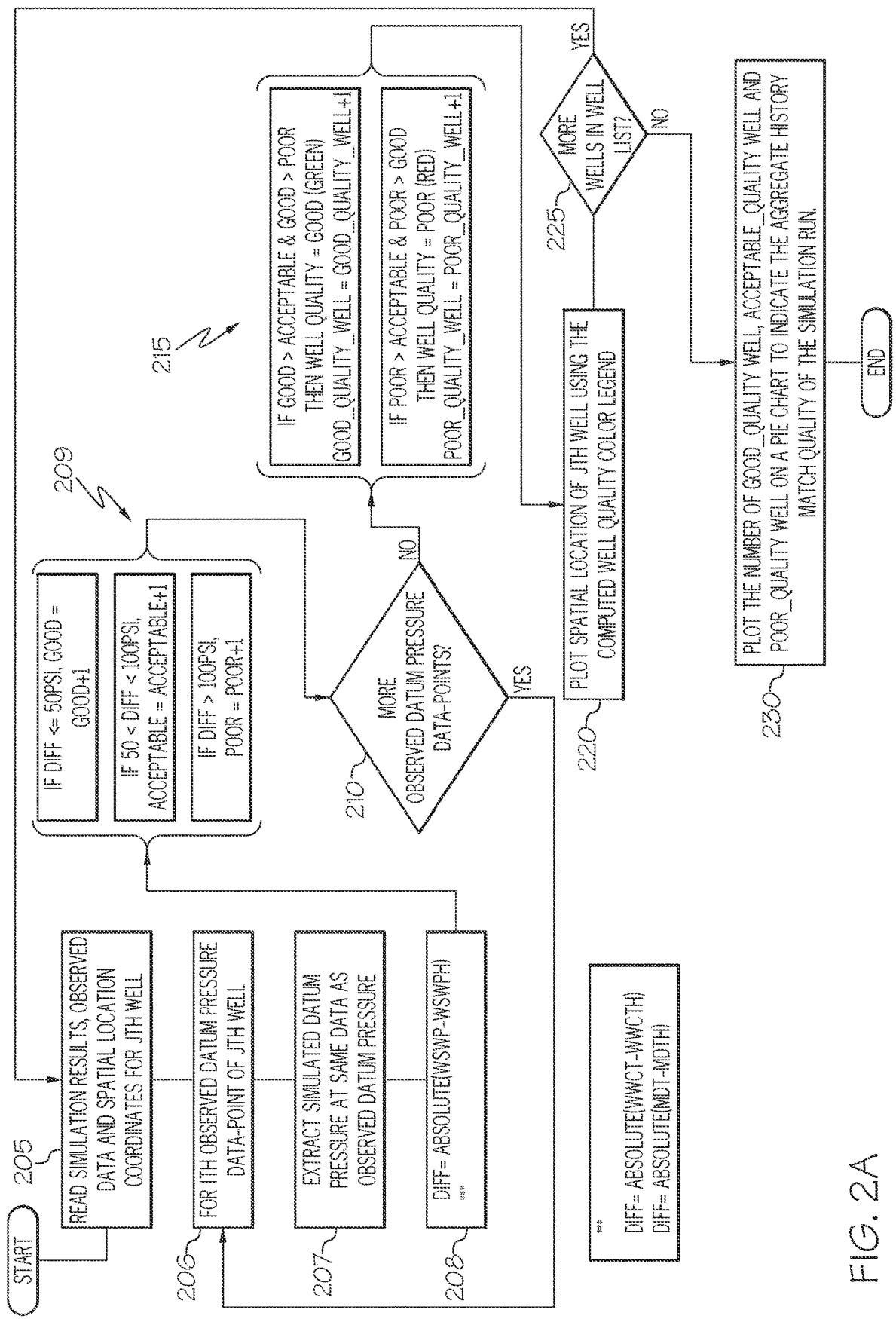
FIG. 2A is a functional block diagram of a set of data processing steps performed in a data processing system for displaying a Spatio-Temporal Viz Graphical user interface using available observed well dynamic data from the field according to the present disclosure.
Figure 2B:
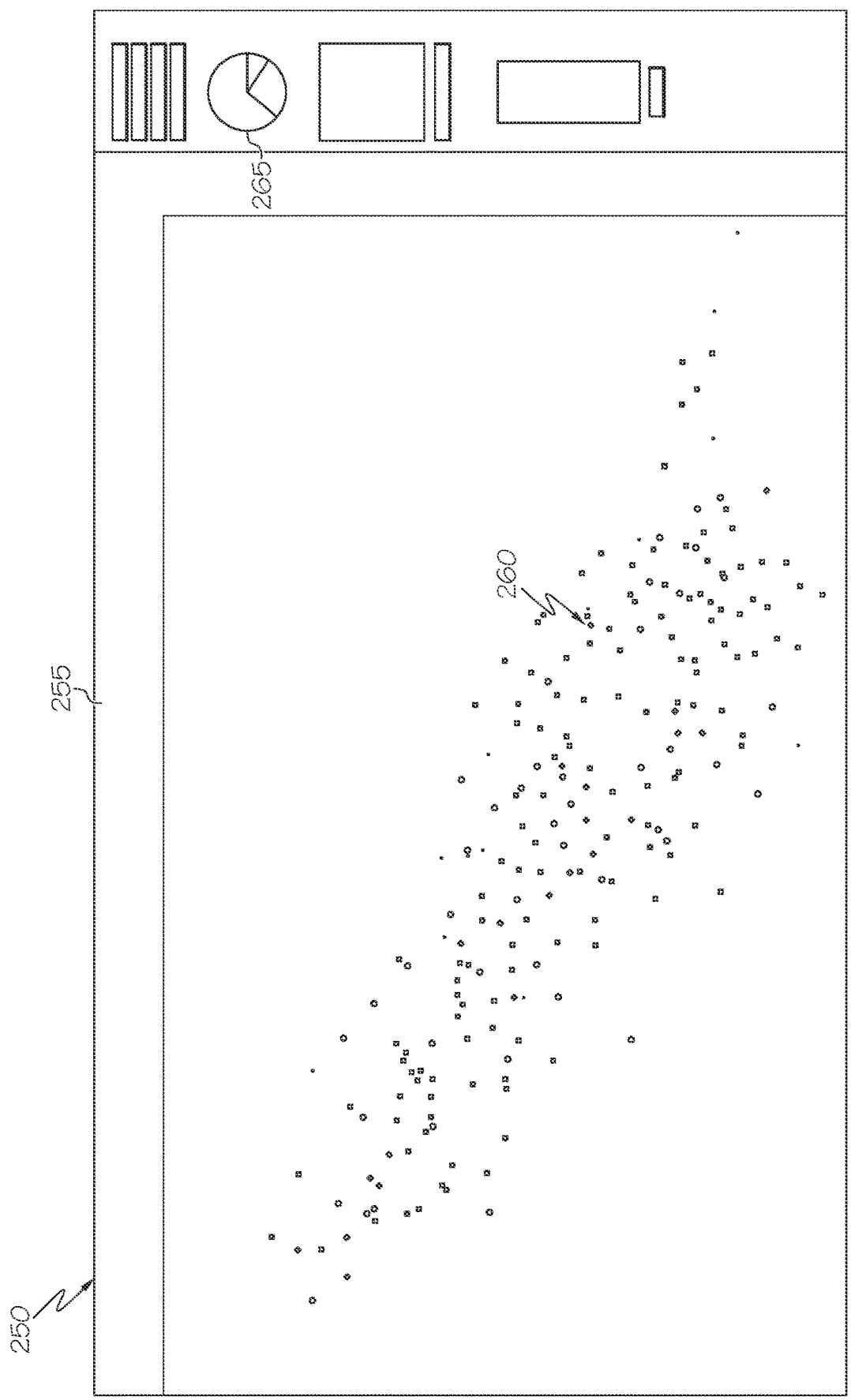
FIG. 2B is a screen shot depiction which shows a Spatio-Temporal Viz Graphical user interface showing the results of the set of data processing steps of FIG. 2A performed in a data processing system according to an embodiment of the disclosure.

FIG. 2A is a functional block diagram of a set of data processing steps performed in a data processing system for displaying a Spatio-Temporal Viz Graphical user interface using available observed well dynamic data from the field according to the present disclosure.

FIG. 2A illustrates process 200 as a flow chart and a set of processor steps implemented as program code 125a and performed by the processer 124 according to the methodology of the present disclosure in the data processing system D (FIG. 1D) which results in a visualization of history-match quality in space according to the present disclosure.

Process 200 may be initiated at block 205 with reading simulation results, observed data and spatial location coordinates for $j^{th}$ well. At block 206, the $i^{th}$ observed datum pressure data-point of $j^{th}$ well is determined and at block 207 simulated datum pressure is extracted at same data as observed datum pressure. At block 208 an operation is performed to determine the difference, such as diff=Absolute(wswp−wswph). At block 209, the difference is characterized and at block 210, process 200 determined whether more observed datum pressure points are needed. If more datum points are needed (e.g., "YES" path out of block 210), process 200 returns to block 206. If not, process 200 determines a characteristic of the well as good, acceptable, or poor. At block 220, the spatial location of jth well is plotted using the computed well with a graphical element indicating the quality determination, such as a quality color legend. At block 225, process 200 determines if more wells are to be characterized. At block 230, process 200 plots the number of good quality wells, acceptable quality wells and poor quality wells as a display element, such as a pie chart, to indicate the aggregate history match quality of the simulation run.

FIG. 2B is a screen shot depiction which shows a Spatio-Temporal Viz Graphical user interface showing the results of the set of data processing steps of FIG. 2A performed in a data processing system according to an embodiment of the disclosure. An example output of the process 200 is illustrated by FIG. 2B, which is a screen shot depiction which shows a Spatio-Temporal Viz Graphical user interface 250 showing the results of the set of data processing steps of FIG. 2A according to an embodiment of the disclosure. This interface permits the visualization of history-match quality in space as shown in FIG. 2B. Actual well names and field boundary have being masked for confidentiality purposes.

The plot of FIG. 2B is made for the purpose of datum pressure match quality, water-cut match quality, MDT match quality, and the likes. The Pie chart 265 in FIG. 2B shows the history match statistics for a given simulation run. That is, how many wells have a good match (as explained in HMA section), how many wells have acceptable match, and how many wells have a poor match. The overall quality of the simulation run is that of the largest pie. In this case the simulation run has a poor quality, because majority of the wells have poor match quality.

Existing prior art visualization software permit only visualizations at well by well mode without any spatial cognizance of the well locations. For example in FIG. 2B, well 260 which has a good match quality and is surrounded by wells with poor quality immediately raises a flag that requires attention. In this case, it was realized that well 260 has recently being recompleted in another reservoir, and the recent pressure being measured are wrongly included in the measured pressure data for this well. In a well by well visualization, such an anomaly has a high chance of going unnoticed.

In addition, different runs can be compared to see how most recent geo-model modifications has impacted the history match qualities of the wells. The processor steps performed according to the methodology of the present disclosure in the data processing system D (FIG. 10) are the same as depicted by the flowchart of FIG. 2A just repeated for a second simulation run, in which the plot label is shown as a smaller circle inside the bigger circle of the first simulation run. Whenever a given well quality is the same in the two simulation runs, the colors would be the same and hence no differentiation of colors seen at that well location. Whenever the well quality is different, we would see a smaller colored circle inside a bigger different colored circle.

Figure 3:
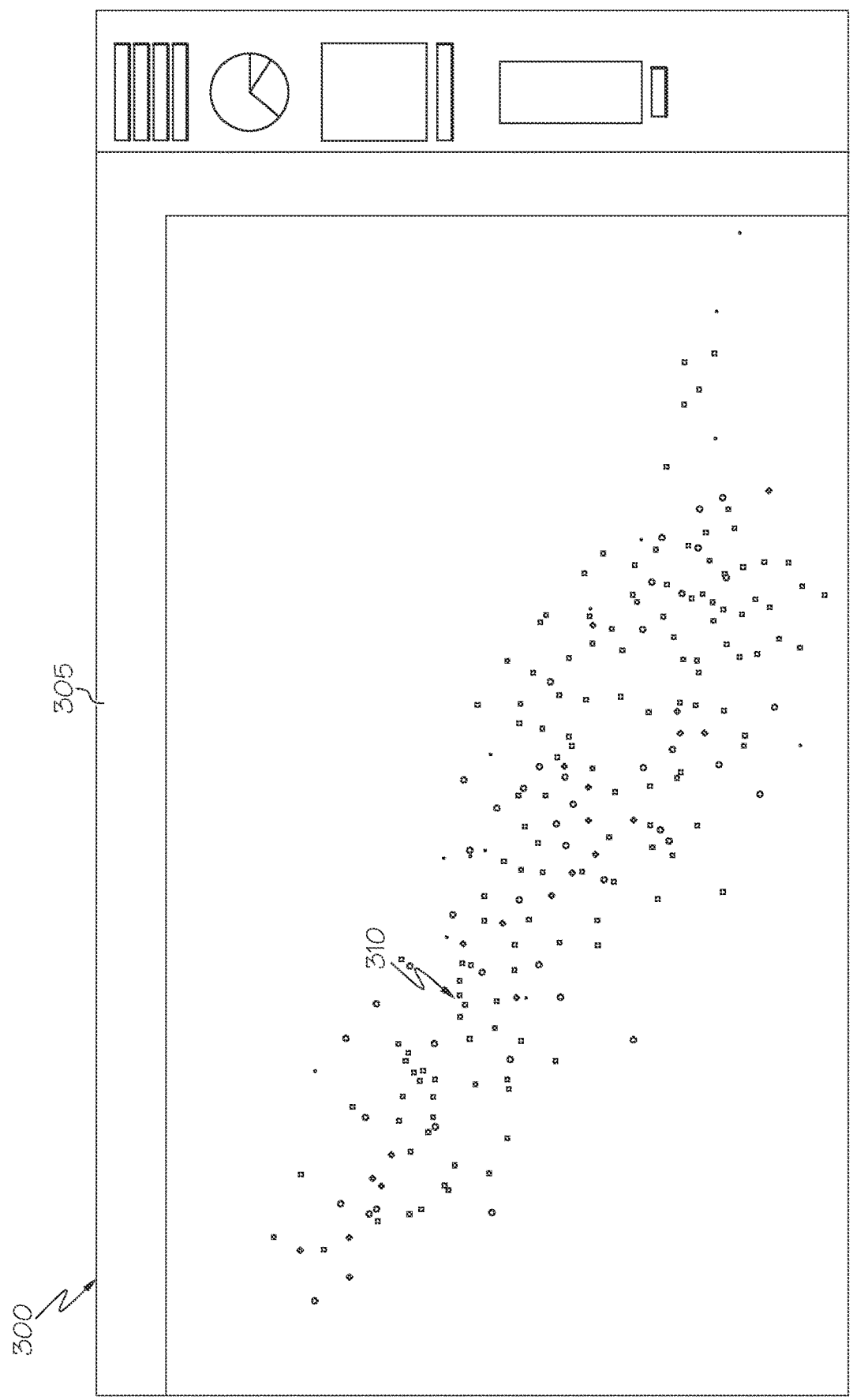
FIG. 3 is a screen shot depiction of a user interface screen showing a Multi-run comparison of wells' datum pressure history-match quality in space resulting from the set of data processing steps of FIG. 2A performed in a data processing system according to an embodiment of the disclosure.

FIG. 3 is a screen shot depiction of a user interface screen 300 showing a Multi-run comparison 305 of wells' datum pressure history-match quality in space resulting from the set of data processing steps of FIG. 2A performed in a data processing system according to an embodiment of the disclosure. The user interface of FIG. 3, can display several wells (e.g well 310) such that wells may be turned from a red category to a green category, while some other wells also turned from green to red category in the user interface. In this example, the geo-model modification that turned wells from red to green category was applied only on a limited region of the model. Having seen the benefit of such modification on the concerned wells, it would then be applied on the entire geo-model. Well by well view that we have available today cannot give such quick insight.

Trend Module

FIG. 4 is a screen shot depiction of a user interface screen which shows a Time-lapse pressure plot display for all wells completed in the same reservoir resulting from the set of data processing steps of FIG. 2A performed in a data processing system according to an embodiment of the disclosure.

According to embodiments, the trend module may perform multiple runs of datum pressure. Pattern recognition may then be used to automatically group all time lapse pressure trends and create a spatial sample of wells by pressure group. Different views of the user interface can be compared using the output of processor steps performed according to the methodology of the present disclosure in the data processing system D (FIG. 10) as depicted by the flowchart of FIG. 2A. For example, a user may select to view the data resulting from the flow chart of FIG. 2A in a Time-lapse pressure plot 400 for all wells completed in the same reservoir as depicted by FIG. 4 according to an embodiment of the disclosure. Each well in a reservoir will usually have several measured datum pressure (time-lapse pressure), and the Time-lapse pressure plot 400 display for all wells completed in the same reservoir depicted by FIG. 4 provides an initial visual appreciation of the various pressure groups prior to detailed isolation of the wells belonging to each group according to an embodiment of the disclosure.

Time-lapse pressure are shut-in pressures recorded in each well at different times over its production/injection life. If neighboring wells are in dynamic communication, then it is expected that they will have the same trend of time-lapse pressure. FIG. 4 illustrates pressure measured from several wells over a period of time. As shown in FIG. 4, there are about 3 trends of pressure. Since there are a lot of wells (about 200 in FIG. 4), a pattern recognition algorithm is used to determine which wells belong to which trend.

Figure 5A:
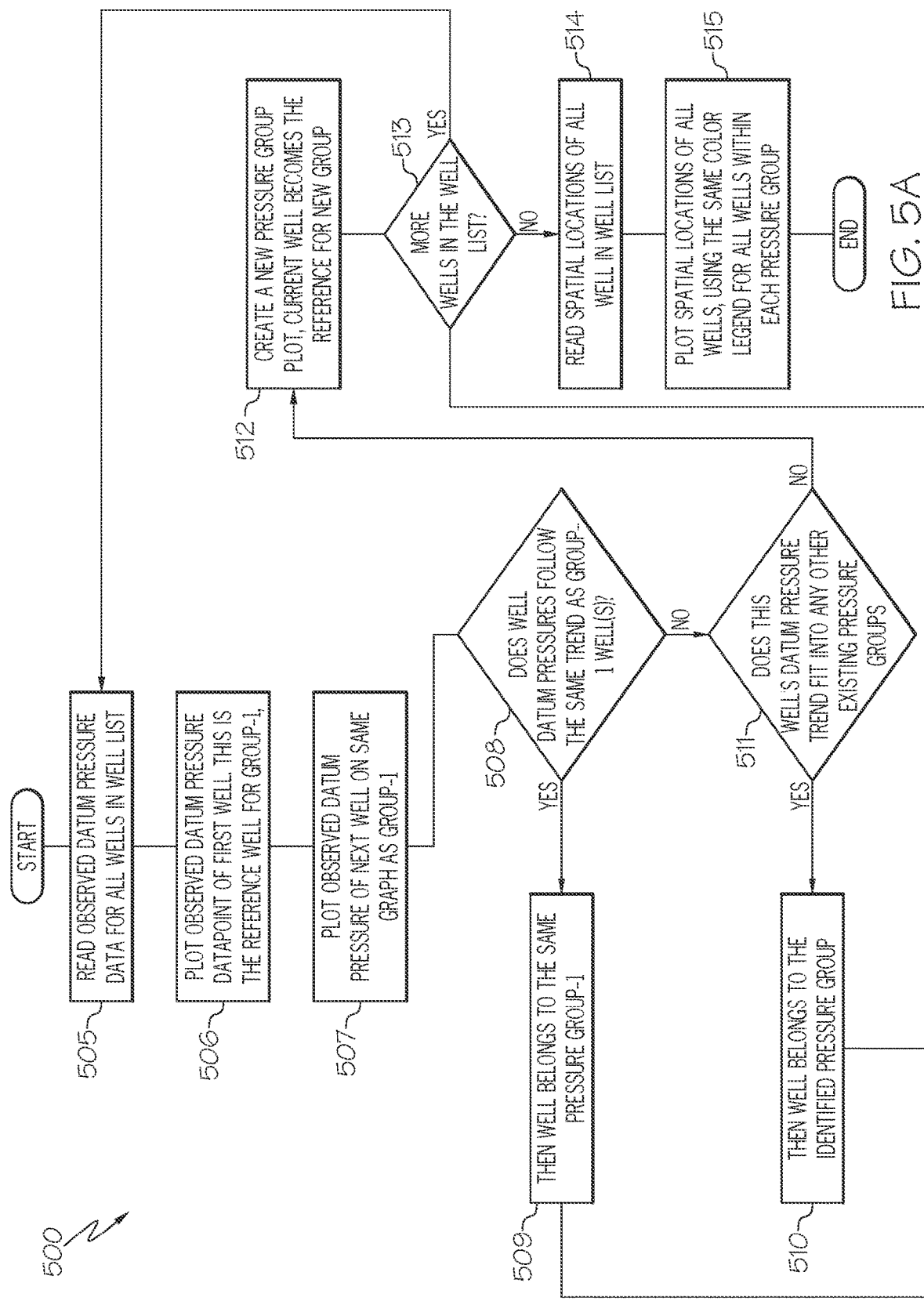
FIG. 5A is a functional block diagram of a set of data processing steps performed in a data processing system for displaying a Spatial view plot display of identified pressure groups for all wells in the same reservoir according to an embodiment of the disclosure.

According to embodiments, different views may be provided by further processor steps to help with the HM quality assessment. FIG. 5A is a functional block diagram of a set of data processing steps performed in a data processing system for displaying a Spatial view plot display of identified pressure groups for all wells in the same reservoir according to an embodiment of the disclosure. The processor steps of FIG. 5A use pattern recognition for automatic grouping of all time-lapse pressure trend and creating a spatial display of all wells colored by the pressure group to which they belong.

Process 500 may be initiated at block 505 with reading observed datum pressure data for all wells in well list. At block 506, observed datum pressure data-points of a first well are plotted as a reference for well group 1. At block 507, observed datum pressure of a next well is plotted on same graph as group-1. At block 508, process 500 determines if well datum pressure follows the same trends as group-1 wells. If so, process 500 then characterizes the well as belong to the same pressure group-1 at block 509. For a well that does not follow the trend at block 508, process 500 determines if the well datum pressure trend fits any other existing pressure groups at block 511. If so, process 500 characterizes the well with the identified pressure group. At block 512 process 500 can create a new pressure group plot, with a well serving as the reference for a new group. At block 513, process 500 cheeks if more wells need to be grouped. At block 514, spatial locations of wells may be read in a well list and at block 515 the spatial locations of wells may be plotted using the same color legend for all wells within each pressure group.

Figure 5B:
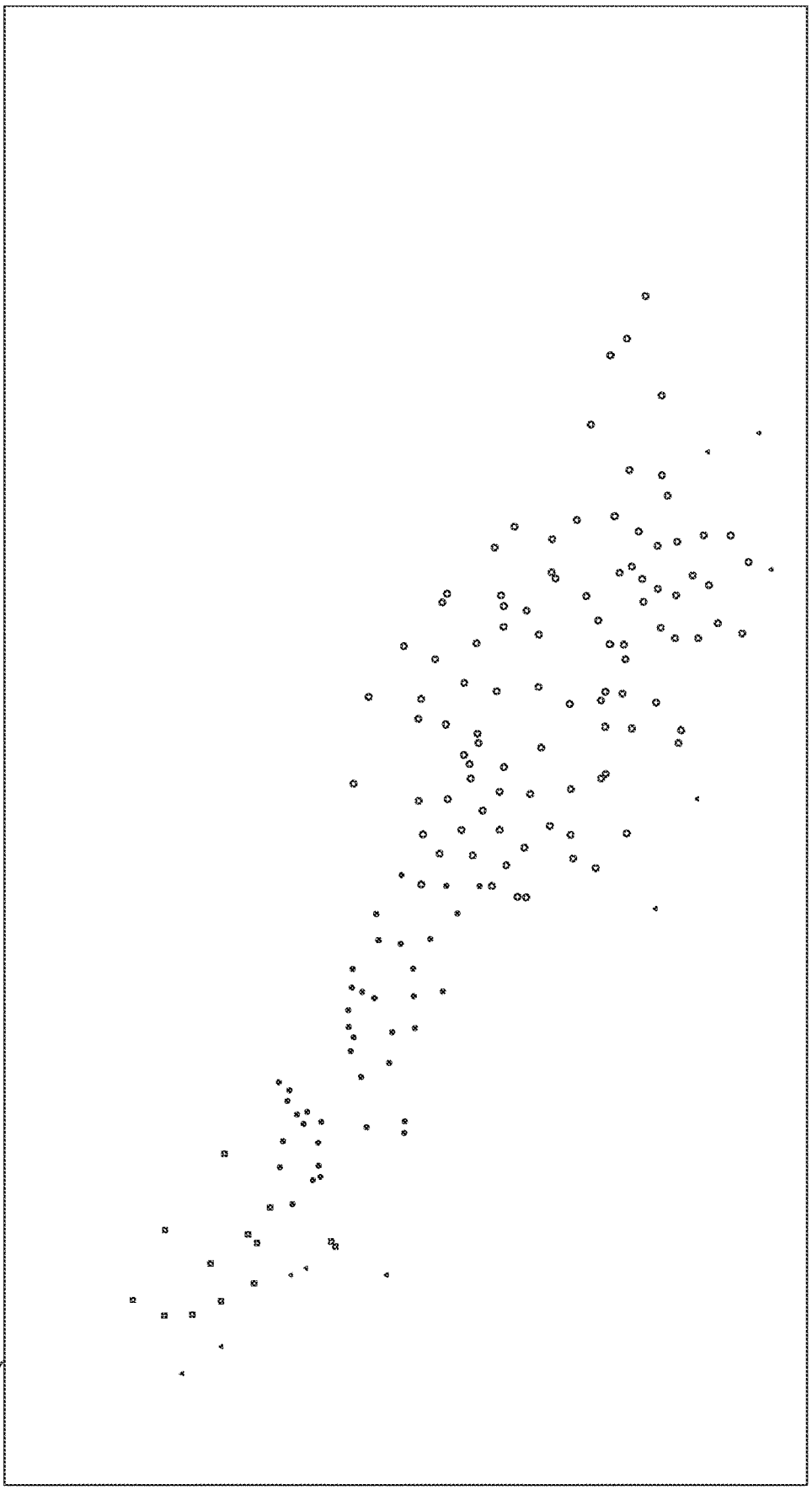
FIG. 5B is a screen shot depiction of a user interface screen which shows a Spatial view plot display of identified pressure groups for all wells in the same reservoir resulting from the set of data processing steps of FIG. 5A performed in a data processing system according to an embodiment of the disclosure.

FIG. 5B is a screen shot depiction of a user interface screen which shows a Spatial view plot display 550 of identified pressure groups for all wells in the same reservoir resulting from the set of data processing steps of FIG. 5A according to an embodiment of the disclosure. Actual well names and field boundary have being masked for confidentiality purposes. Plot 550 is immediately helpful to the geo-modeler who is then required to ensure that the distribution of model permeability ensures that wells within each pressure group are not disconnected by fictitious low permeability barriers caused by improper choice of variogram range.

Figure 6:
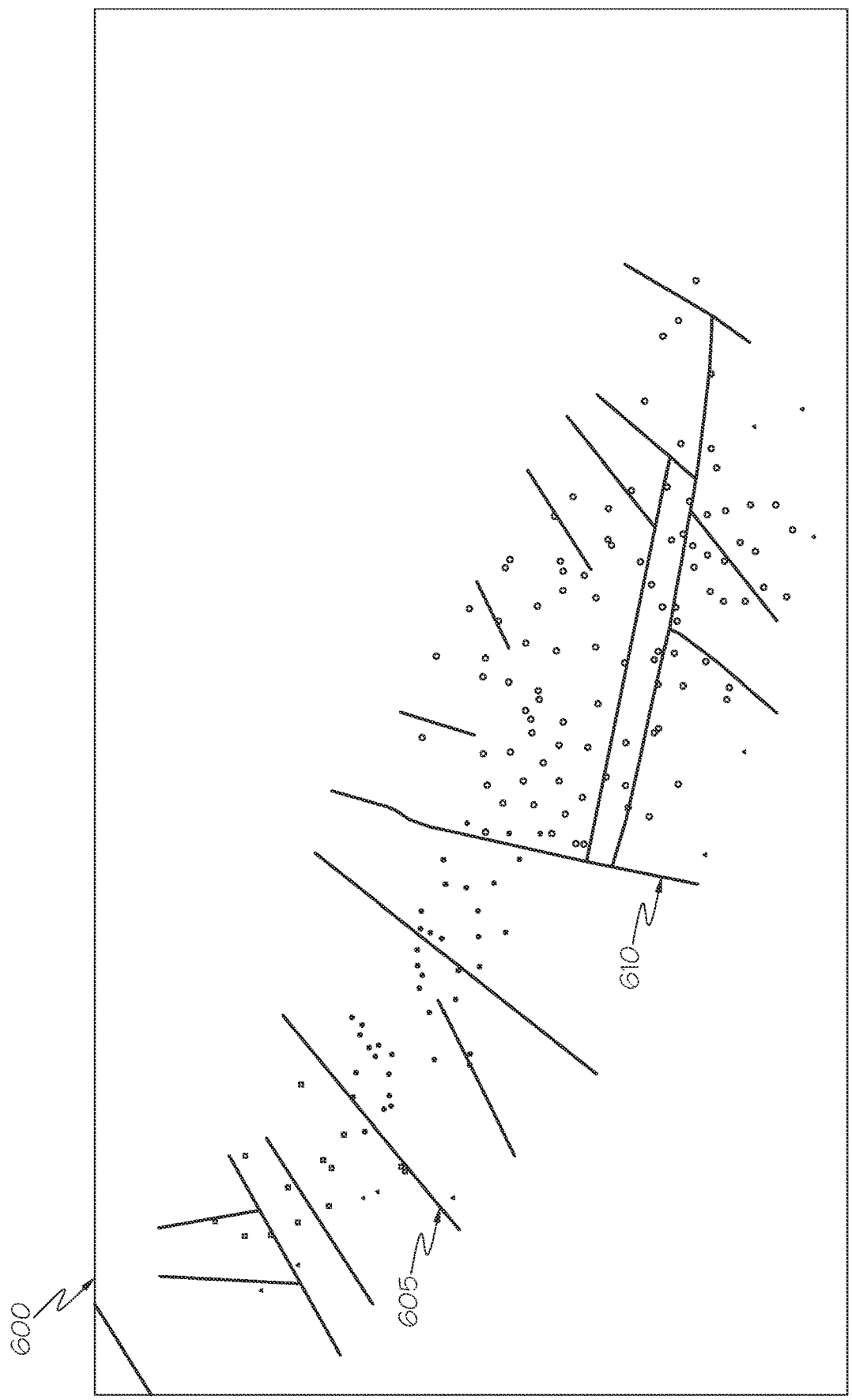
FIG. 6 is a screen shot depiction of a user interface screen which shows a Seismic and geologic faults overlaid on pressure groups map display for all wells in the same reservoir resulting from the set of data processing steps of FIG. 5A performed in a data processing system according to an embodiment of the disclosure.

The other significant value of this Trend visualization is a preliminary assessment of the dynamic nature of any seismic or geologically identified faults, which is determined according to the data processing steps shown by FIG. 5A, except for the addition of the processor reading from the database 126a and plotting on the display 128 fault trace if a reservoir has identified faults. An example output of such processing is illustrated by FIG. 6, which is a screen shot depiction of a user interface screen which shows example Seismic and geologic faults overlaid on pressure groups map display 600 for all wells in the same reservoir resulting from the set of data processing steps of FIG. 6 according to an embodiment of the disclosure. It is seen that of all faults mapped, only F5 and F7, shown as 605 and 610 respectively, seem to have dynamic influence because the observed time-lapse pressure trends of wells changes across these faults. For the other faults, even though they exist, they have no significant barrier effect.

Geo-Probe Module

Figure 7A:
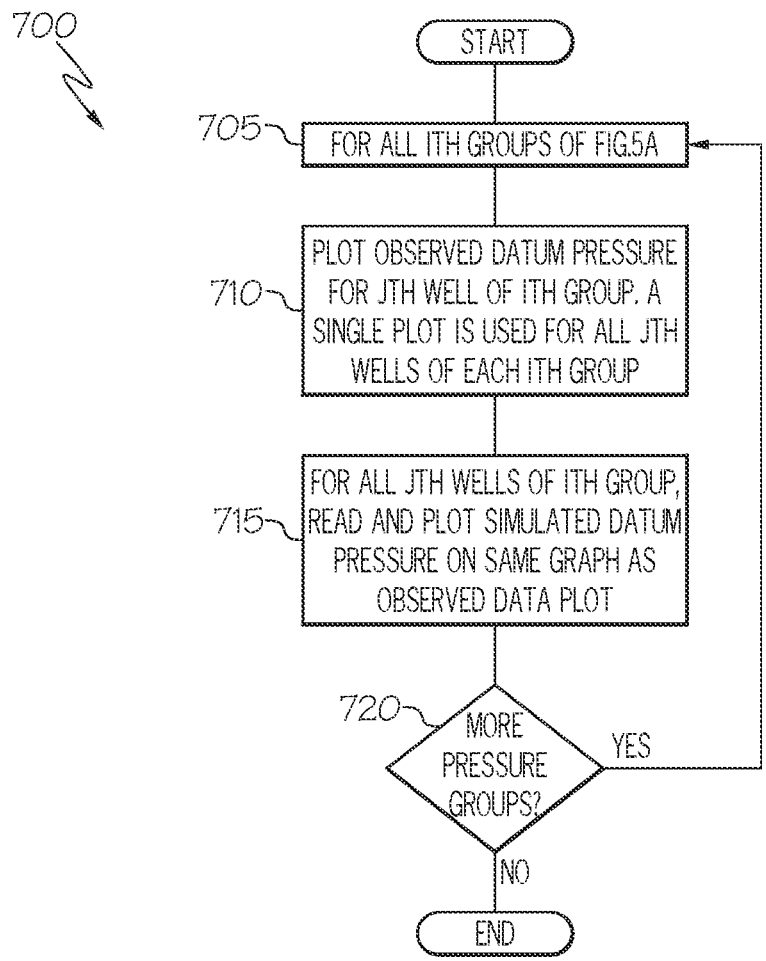
FIG. 7A is a functional block diagram of a set of data processing steps performed in a data processing system for displaying a Comparison of geo-model connectivity with observed well connectivity within identified pressure groups for all wells in the same reservoir according to an embodiment of the disclosure.

FIG. 7A is a functional block diagram of a set of data processing steps performed in a data processing system for displaying a Comparison of geo-model connectivity with observed well connectivity within identified pressure groups for all wells in the same reservoir according to an embodiment of the disclosure.

FIG. 7A is a functional block diagram of a set of data processing steps implemented as program code 125a and performed by the processor 125 in the data processing system 126 for displaying a Comparison of geo-model connectivity with observed well connectivity within identified pressure groups for all wells in the same reservoir according to an embodiment of the disclosure. An example output is illustrated by FIG. 7B.

Process 700 may be initiated at block 705 with selecting/determining all $i^{th}$ groups of FIG. 5A. At block 710, observed datum pressure data for a $j^{th}$ wells of an $i^{th}$ group is plotted, a single plot may be used for all $j^{th}$ wells of each $i^{th}$ group. For all $j^{th}$ wells of the $i^{th}$ group, simulated datum pressure on the same graph may be read and plotted at block 715. At block 720, process 700 may check if more pressure groups are to be evaluated.

Operations of a geo-probe module may be used as a quick check of whether a 3D geo-model is of good quality. Process 700 may receive data for wells, the data is imported into a simulation model and the simulated pressure of all the wells in the same CRR are plotted together on the same graph. Theoretically, all the wells in the same CRR should have observed pressures that show similar trend and are aligned one on top of the other. If simulated plot of all well pressure within a given CRR are nor properly aligned, then the 3D model property is not correct. FIG. 7B illustrates that the simulated pressure of wells in CRR-1 show more significant variation than the observed data show. According to embodiments, geo-probe plots include the simulated pressures of all wells within each CRR, and compare the simulated pressures with the observed pressures from all the wells in the CRR.

FIG. 7B is a screen shot depiction of a user interface screen which shows a Comparison of geo-model connectivity with observed well connectivity within identified pressure groups for all wells in the same reservoir resulting from the set of data processing steps of FIG. 7A according to an embodiment of the disclosure. Plot 700 is a comparison plot to assess the simulated pressure connectivity between wells in a similar group. In FIG. 7B, dots 755 are all the measured datum pressures of all the wells in pressure group-1 (FIG. 5B), while lines 760 are the simulated datum pressures for these same wells.

In the illustrated example of FIG. 7B, the simulated pressures of the wells within group-1 show a wide scatter of up to 700 psi whereas the observed data scatter of these same wells is within 50 psi. The purpose of Geo-probe is not to check whether simulation pressure is matching with observed pressure, but its purpose is to compare simulated pressures from all the wells within a similar pressure group and see if their pressures show the connectivity suggested by the observed pressure data.

Front Module

Figure 8A:
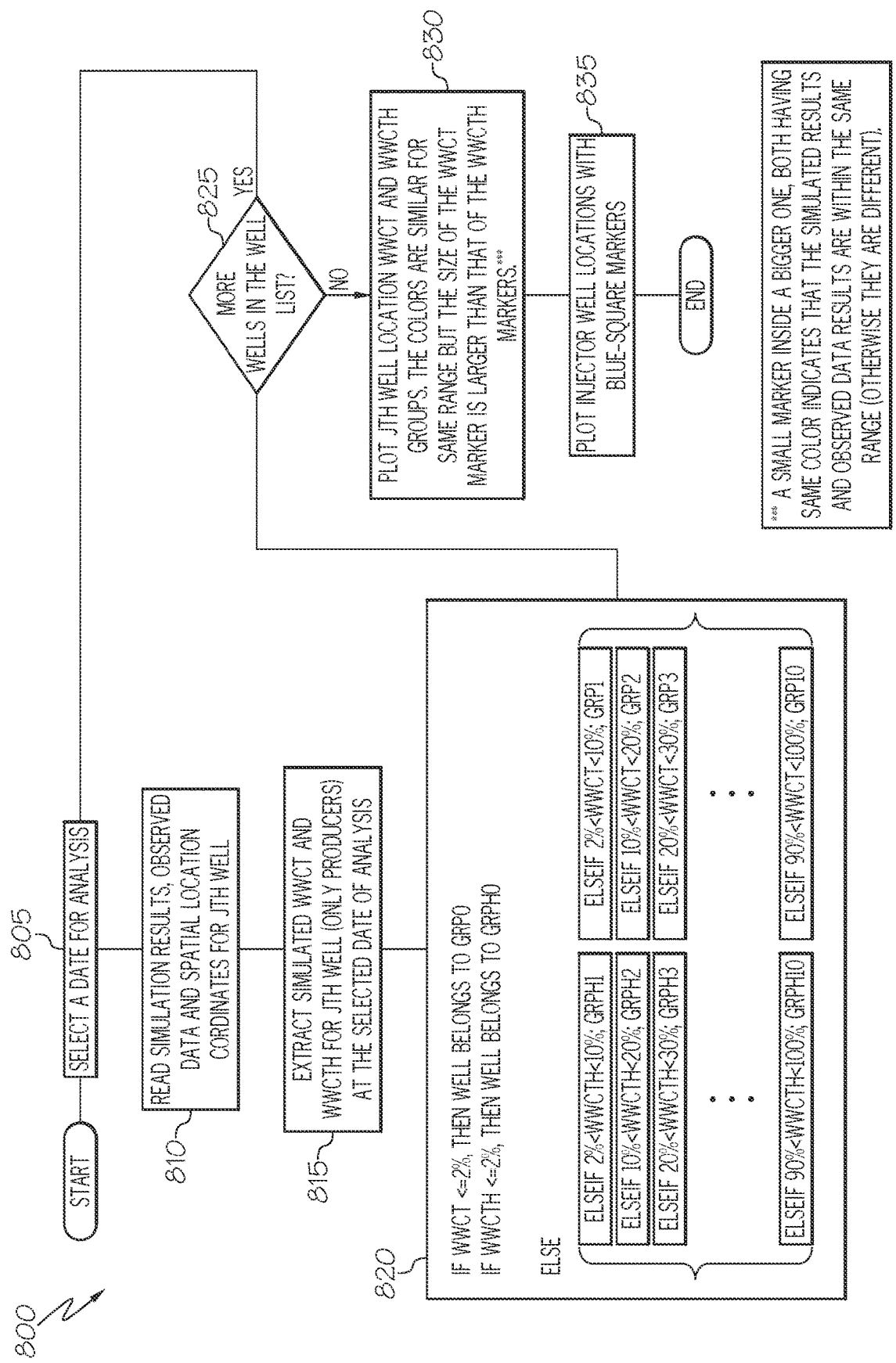
FIG. 8A is a functional block diagram of a set of data processing steps performed in a data processing system for displaying a Front module graphical user interface according to an embodiment of the disclosure.

FIG. 8A is a functional block diagram of a set of data processing steps implemented as program code 125a and performed by the processor 125 in the data processing system 126 for displaying a Front module graphical user interface according to an embodiment of the disclosure.

Process 800 may be initiated at block 805 with selecting a date for analysis. At block 810, simulation results, observed data and spatial coordinates may be read for a $j^{th}$ well. At block 815, simulated wwct and wwcth for $j^{th}$ well (only producers) are extracted at the selected date of analysis. At block 820, wells are grouped and at block 825, process 800 determines if there are more wells in a list to group. At block 830, process 800 plots $j^{th}$ well location wwct and wwcth groups. When plotting the user interface may select graphical attributes, such as colors, wherein the colors are similar for same range but the size of the wwct marker is larger than that of the wwcth markers. At block 835, injector well locations are plotted with colored square markers (e.g., blue square markers).

A front module as described herein may be configured to perform water front tracking (e.g., injection front tracking). through well water-cut data within the software. Front module operations can create a dashboard that indicates the difference between original water saturation and current water saturation at each well location and at every time-step. As such, the dashboard can provide, at any chosen time-step (date), a display of areas of the reservoir have been invaded by water and which are not. Both original and current water saturation may be obtained from simulation results. The front module may take saturation from simulation results as input, and outputs the delta-saturation at each well location at every time-step in a color coded dashboard format. The front module can alternatively use observed water-cut data to create a dashboard that indicates the magnitude of water-cut that have been measured at a well at a given date. By using a colored coded dashboard to represent the magnitude of water-cut measured at each well at a given (date), the distribution of water-producing wells, can be clearly displayed, which by inference indicates the locations that the flood front has reached. Embodiments may alternatively take observed well water-cut data as input.

Figure 8B:
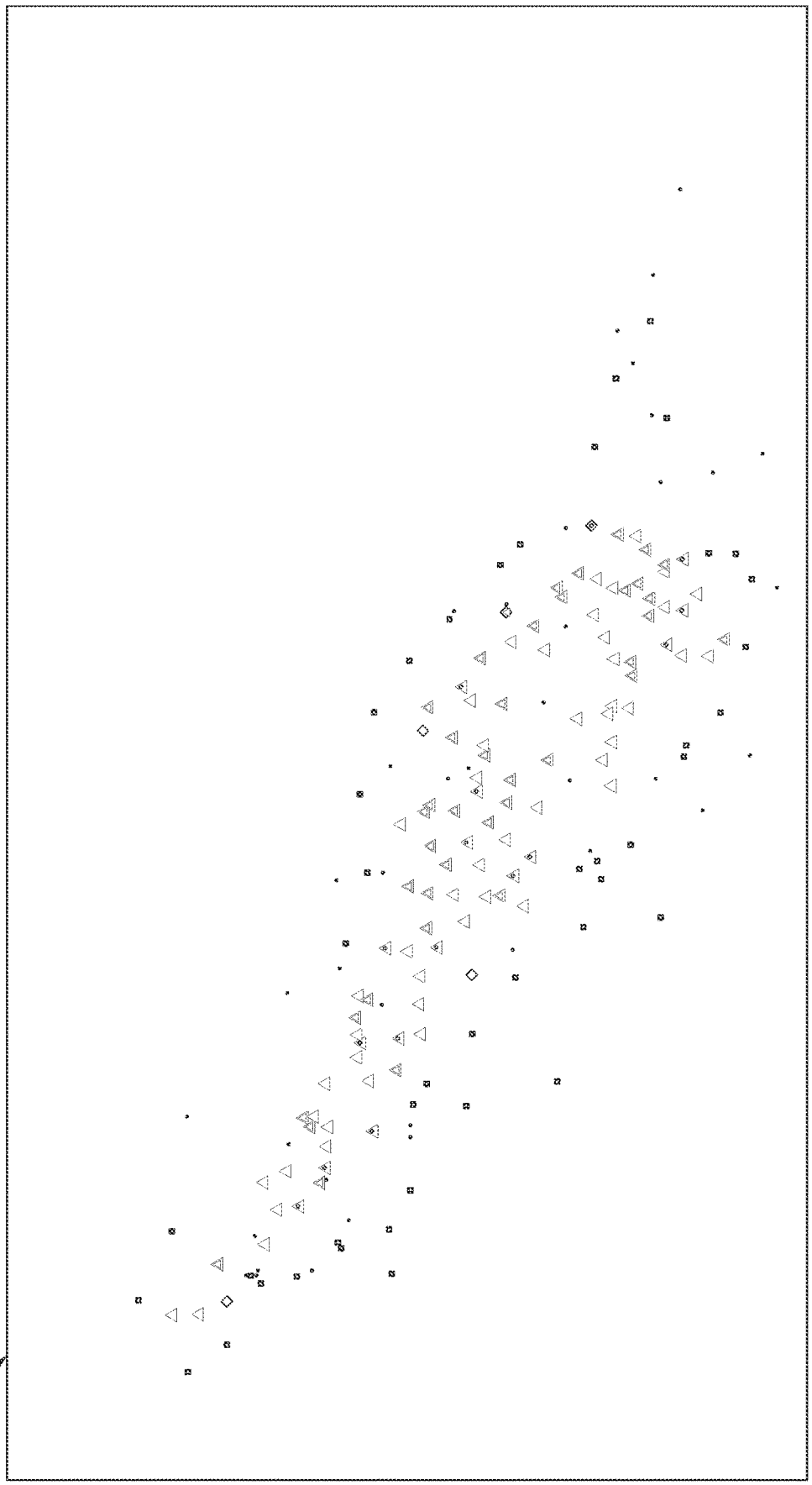
FIG. 8B is a screen shot depiction which shows a Front module graphical user interface resulting from the set of data processing steps of FIG. 8A performed in a data processing system according to an embodiment of the disclosure.

FIG. 8B is a screen shot depiction which shows a Front module graphical user interface 850 resulting from the set of data processing steps of FIG. 8A performed in a data processing system according to an embodiment of the disclosure.

An output example is illustrated by FIG. 8B, which is a screen shot depiction which shows a Front module graphical user interface resulting from the set of data processing steps of FIG. 8A according to an embodiment of the disclosure. The Front module graphical user interface provides a spatial and time-wise visualization of flood front advance through well water-cut data. It always compares observed water-cut with simulated water-cut in order to have a global perspective of whether or not the simulation model follows the observed flood front advance. Existing visualization like Sim-reservoir by Roxar allows the visualization of saturation front, but does not incorporate observed data and so we cannot know from Sim-reservoir alone whether simulated front is consistent with observed data. Also, Tempest visualization by Roxar allows a visualization of water-cut match at well level, but does not give a perspective on global front advance with time. These same limitations also exist with Floviz and Eclipse-Office by Shlumberger.

In FIG. 8B, the bigger circles are simulation result markers and the color of these bigger markers in a user interface may be controlled such that the color depends on the range of water-cut as shown on the legend. For example, a Green (grp0) color may mean less than 1% water-cut, grp1 means from 2 to 10% and grp10 means from 90-100% water-cut. Field boundary and actual well names have been masked. The smaller circles are markers for the observed water-cut data and their colors and group is exactly like the simulated result markers. Hence whenever there is a match between simulated and observed water-cut, there would be a small circle inside a big circle without any color contrast. But whenever there is a mis-match, there would be a small circle within a bigger circle with a visible color contrast.

This view can be displayed at chosen time-step by selecting the preferred date, alternatively, all time steps can be played automatically like a movie by clicking the Track button.

In this particular time step showed, we can see that the observed data suggest that crestal wells are at about 10% water-cut(grp1), but simulation results suggests that the crestal wells are still at 0% water-cut. Hence we see a lot grey small circles inside big green circles.

Insight Module

Figure 9B:
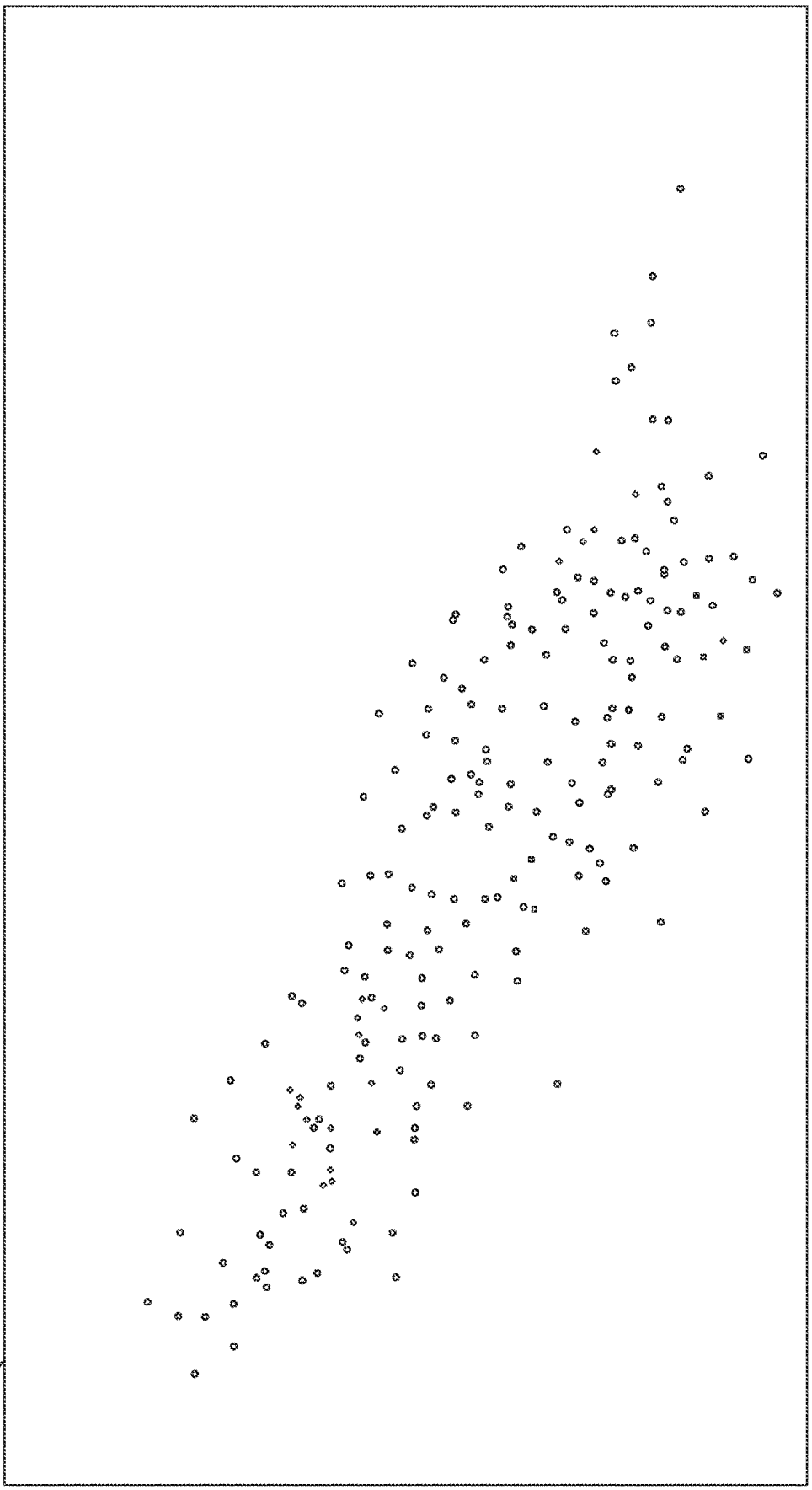
FIG. 9B is a screen shot depiction which shows an Insight graphical user interface resulting from the set of data processing steps of FIG. 9A performed in a data processing system according to an embodiment of the disclosure.

FIG. 9A is a functional block diagram of a set of data processing steps implemented as program code 125a and performed by the processor 125 in the data processing system D for an Insight graphical user interface according to an embodiment of the disclosure. While dynamic data plotting are the basis of ascertaining a history-matched model, it is static data that is usually modified in order to achieve this history match. Hence it is necessary to review the static data modifications that were employed to move from initial geo-model to a history matched geo-model. An output example for making such comparison is illustrated by FIG. 9B, which is a screen shot depiction which shows an Insight graphical user interface resulting from the set of data processing steps of FIG. 9A performed in a data processing system according to an embodiment of the disclosure. Actual well names and field boundary have been masked for confidentiality purposes.

Process 900 may be initiated at block 905 with reading simulation results of model 1 and model 2, first and second models respectively. At block 910, for model permeability is extracted for model_1 & model_2, at every k-layer where $j^{th}$ well is connected to the grid. Model permeability is then calculated for each connected k-layer at block 915. At block 920, for each connected k-layer a color code may be determine for each well. Process 900 may include checking of more wells need to be processed at block 924 and plotting $j^{th}$ well locations using color code corresponding to calculated permeability.

During processing of the processor steps of FIG. 9A, original and final Permeability in all grid penetrated by a given well is compared and the multiplier factor is recorded. If the maximum factor for a given well is less than two, then, it colors that well green (good), if the maximum factor is between 2 and 5 it colors the well yellow (acceptable), if the maximum factor is between 5-10, it colors the well brown (questionable) and if greater than 10, it colors the well red (poor) as shown in FIG. 9B. This module helps peer reviewers and management employees who are not involved in the day-to-day process of history matching to be able to see at a glance the size and extend of modifications that have been made to the original geo-model. The example shown in FIG. 9B shows that modification factors greater than 10 have been used around the north-central wells.

Prior art tools, like SimReservoir by Aramco, make a difference map between the initial and static model, but then, visualization of difference would either be done by scrolling through each layer or by finding the average of all layers and displaying this average. The limitations of this approach are (i) in a typical model containing 150 layers, it would be very tedious and time consuming to look through the difference map of each of the layers and (ii) in a case where modifications are made on just 10 layers, the effect of this modifications on 10 layers may be lost in the average map approach. With the current disclosure, every modification, no matter how small in scale or scope would be detected. This is an important tool for peer and management review.

In general, by the above disclosure it is to be appreciated that embodiments of the present disclosure uses pattern recognition data analytics to group wells' time-lapse datum pressure data. The resulting pressure groups map, as depicted by FIG. 1B and FIG. 2B for well groupings that have similar time-lapse pressure evolution, are useful in making a quick assessment of the sealing nature of faults and as input into 3D permeability modelling. This pressure groups map is referred to as Connected Reservoir Regions CRR subsequently. This information results in creation of connected reservoir regions which helps understand the nature of faults (FIG. 3) or be used by geo-modeler to choose the appropriate variogram ranges for 3D permeability distribution in order to preserve continuity within each CRR.

The current disclosure provides simultaneous visualization for all history-matching parameters for each well. This allows the history matching of all parameters to proceed simultaneously rather than the existing practice of sequential process.

The above disclosed Front module permits water front tracking through wells' water-cut data. This is important for placement of infill wells and for reviewing producing and injection strategy to ensure a uniform front advance across the field.

The above disclosed 3D module provides a rapid feedback about the quality of 3D geo-model by checking whether the 3d static model connectivity is representative of observed connectivity in each pressure group.

Datum pressures are regularly measured on each well for reservoir monitoring and management and there exists 10's of thousands of such data per reservoir.

It is to be appreciated that the above disclosed modules provide a technical solution to the problem of seeking smarter and faster means of visualizing well data, such as datum pressures, MDT, PLT, PNL, water-cut, core data, PVT sample, Pressure Transient Testing PTA, etc., at field scale for multiple reservoirs, each having several hundreds or even thousands of wells, and intelligently integrating all these data for a better and faster reservoir understanding, model calibration (History matching) and field development (Prediction).

For example, to ensure faster reservoir model calibration, the above described modules enable simultaneous history matching of all available dynamic parameters. This it does by providing a visualization of all these well data in a single view and advice on what modifications are necessary in order to ensure simultaneous consistency with all observed data. More discussion was given earlier, under History Match Advisor Module (FIGS. 1A and 1B). In addition, for example, to ensure better reservoir model calibration, the above described modules permit spatial visualization of history match quality. For example, as was shown in FIG. 2B, a green wellB surrounded by red wells raised and immediate flag which made us realize that the input data for wellB were incorrect. Using the existing well-by-well visualization, such an error would not have been spotted. By adopting field level visualization of data and history match quality, each well is validated against surrounding wells for consistency. More discussion is provided in sections associated with the Spatio-Temporal Visualization Module (FIGS. 2A-3).

Furthermore, data integration is for example achieved by the Trend module where pressure groups are used as an initial basis to understand the nature of independently defined faults as shown in FIG. 6.

Moreover, these pressure groups are further integrated into the geo-modelling workflow in order to ensure that spatial connectivity of model is consistent with observed pressure connectivity as illustrated in FIGS. 7A and 7B.

In summary, embodiments of the present disclosure use spatio-temporal advisory plots together with data analytics to achieve improved reservoir understanding and faster data integration and model calibration.

The inventor has also noted that prior art software-based systems, such as e.g., Tempest View by Roxar, Eclipse Office by Schlumberger, SimReservoir by Aramco, Floviz by Schlumberger, and OFM by Schlumberger, all though suitable for their own purposes, fall short in addressing the above noted problems that the modules of the present disclosure address. For example, the focus of Tempest View and Eclipse Office are well-by-well line plots, they do not offer spatio-temporal view of history-match quality as shown in FIG. 2B. In a typical type of scenario where a reservoir has 600 wells, how can an engineer check the history-match quality of 600 wells, one at a time, and do this for every new simulation run. The process would be slow and tedious. The modules of the software lets the engineer see at a glance where the poor matches are, thereby making the process of deciding the way forward faster.

SimReservoir can be used to provide spatio-temporal displays, but it is only limited to simulation results. So for example SimResevoir can display movement of water front with time across different wells, but it cannot compare this result with observed data (as shown in FIG. 8B) in order to advice whether simulation result is consistent with measured data or not.

Current tools do not provide the kind of final vs. initial static model comparison shown in FIG. 9B. By reducing a 3D comparison problem to 2.5D, that is, 2D comparison displayed spatially. The invented tool makes comparison faster and changes much easier to detect as earlier explained.

Current visualization tools do not provide data analytics functionality that helps to extract information about reservoir connectivity regions from pressure data, neither do they support the kind of data integration between pressure data and structural faults shown in FIG. 6.

Prior art tools focus on well-by-well visualization and do not provide a spatial view of data, hence making field level quality check impossible as discussed in FIG. 2B, Prior art visualization tools encourage history matching to be done in a sequential fashion. This is because history matching parameters like datum pressure, water-cut, GOR, MDT, PLT, PNL have to be viewed individually and from different sections of the tool (for example, in Tempest-View, there is Well Summary section containing time dependent parameters and Wellbore section containing depth dependent parameters). Also Eclipse Office has the Summary section for time dependent parameters and the Solution section for depth dependent parameters.

Because of the inconvenience of moving between different folders, engineers would usually complete the history matching of parameters available in one section of the tool before moving to the next. The limitation here that when the history matching of time dependent data has been completed, the model modifications required to history matching the depth dependent parameters may distort the completed time dependent parameters. Hence the need for a tool that provides all these visualization in one window, so the engineer can progress with both time dependent and depth dependent parameters simultaneously.

Prior art methods are just for visualization and do not have functionality for data integration. They cannot create pressure groups using data analytics, they cannot use these pressure groups to define CRR, they cannot integrate the derived CRR with structurally defined seismic-geological faults and 3D geo-model connectivity as shown in FIG. 6 and FIG. 7B.

In short, prior art methods are just visualization tools and cannot be used for data integration (FIGS. 6 and 7B), they cannot be used for rapid peer or management review of static parameters modifications (FIG. 9B) and cannot be used for visualizing spatial relationship between individual well data (FIG. 2B).

Some of the noted technical improvements and technical advantages, and not limited thereto, provided by the embodiments of the disclosure are as follows. Ability to view both time dependent and depth dependent history matching parameters at once makes history-matching process faster and less tedious especially with large reservoirs having several hundred wells FIG. 1B Ability to view well data spatially at reservoir scale allows a high level quality check of well data (FIG. 2B). The incorporation of data analytics (automatic pressure pattern recognition and grouping) permits the extraction of extra useful information from measured datum pressure data FIG. 5B. Ability to integrate input data. For example data analytics is used to create CRR FIG. 5B, this CRR is integrated with Fault data to determine the sealing efficiency of Faults. For example in FIG. 6, the numerous faults in the south cannot be sealing because wells across them show similar time-lapse pressure trend. The barrier faults are F1 and F2. Geology and Seismic can define these faults but do not know their dynamic nature, by using data analytics and integration, this new tool provides preliminary understanding of the nature of these faults before any reservoir simulation work. One dimensional (1D) comparison of static property changes being offered by prior art tools have been upgraded to 2.5D, where well level comparison results are displayed (not as line plots) but as quality indicators in space FIG. 9B.

Figure 12:
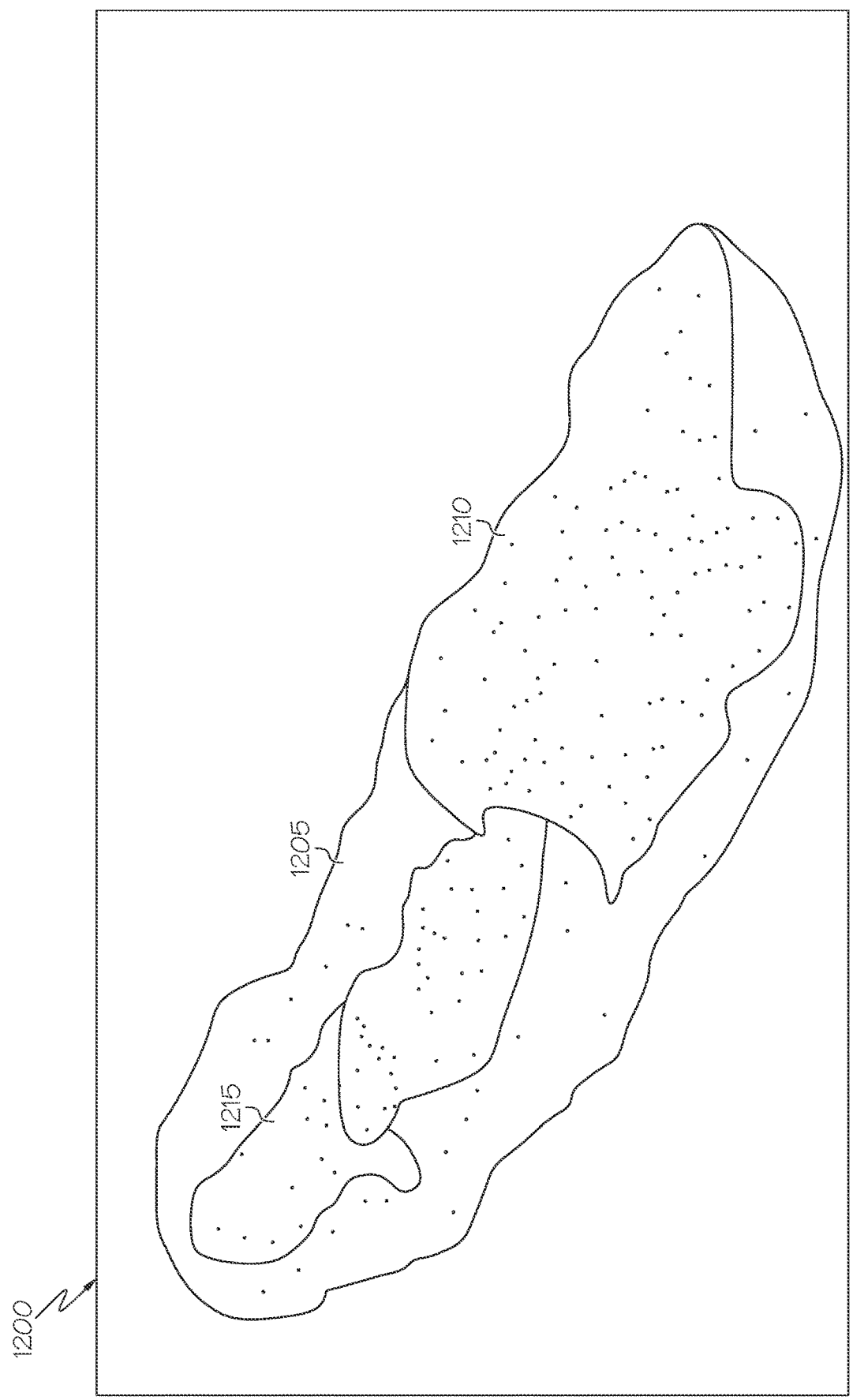
FIG. 12 illustrates CRRs according to embodiments and visualization output according to embodiments.
Figure 13:
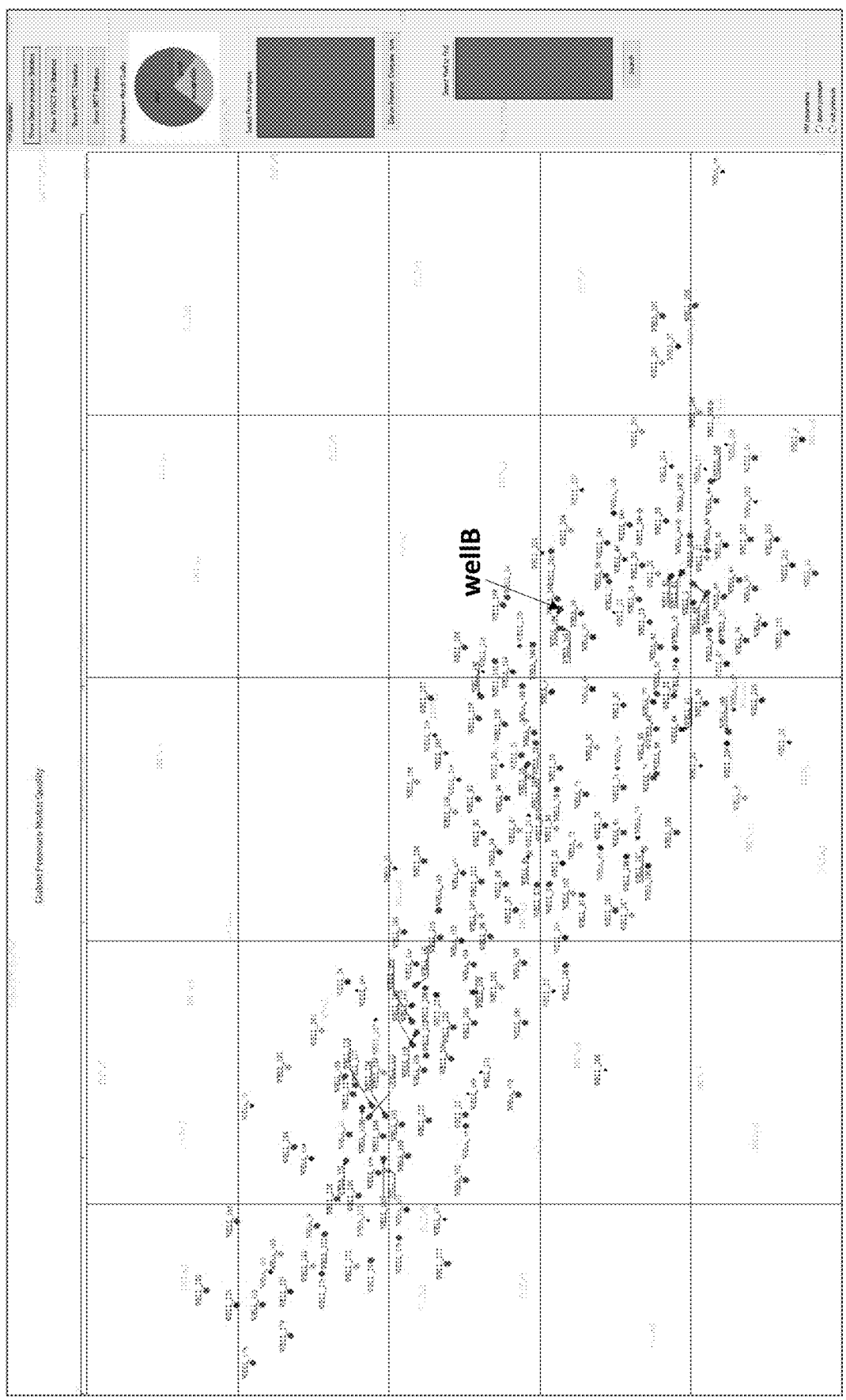
FIG. 13 illustrates a color photograph version of FIG. 2B, according to embodiments herein.

FIG. 12 illustrates a graphical representation of connected reservoir regions according to embodiments. Regarding pattern recognition for grouping wells, a model may be selected/identified, observed data is received, and pattern recognition is performed. As discussed herein, wells may be grouped into Connected Reservoir Regions (CRR) such that CRRs appear to be wells identified as part of the pattern recognition and are a part of pressure group maps. According to embodiments, pattern recognition may be performed by a computer code that takes the time-lapse pressure data as input, and then outputs a text file containing well names and associated pressure group, as shown in rightmost image below. The code may also take additional input information of well location coordinates and plots the location of each well using same graphical/color code for all well in the same group, as shown in FIG. 5B for example.

FIG. 12 illustrates an example user interface 1200 including a reservoir region and connected reservoir region 1205. Systems and methods described herein may determine one or more regions, such as CRR 1210, and CRR 1215 for wells in connected reservoir region 1205. Connected reservoir regions CRR 1210, and CRR 1215 may be areas or polygons that define the spatial limits of each pressure group. It is the spatial limits within which reservoir shows dynamic communication. User interface 1200 illustrates four CRRs.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc. For example, a device, a receiver, a processor a computer or a display do not limit the embodiments to single articles.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for determining and presenting field view history-matched well quality data, the system comprising:
   a plurality of wells in a well field;
   a plurality of downhole sensors in the well field, the plurality of downhole sensors configured to generate well data including dynamic well data measurements for datum pressure, water-cut, gas to oil ratio (GOR), measurement of pressure with depth (MDT), well fractional water saturation variation with depth (PNL), well productivity variation and water production variation with depth (PLT), or combinations thereof;
   at least one receiver configured to receive the well data for the plurality of wells in the well field; and
   at least one history matching processor configured to
      perform a plurality of functional operations using the well data and a model of the well field, and
      output a history match advisor interface, the history match advisor interface including visualizations for each of the plurality of functional operations and a representation of a history match static model, wherein the plurality of functional operations include:

a trend operation configured to determine well groups using pattern recognition of well time lapse pressure trends based on the well data, wherein the trend operation is configured to identify at least one connected reservoir region (CRR);

a geo-probe integration operation configured to integrate data for each CRR and evaluate a three-dimensional (3D) static model for wells in of each CRR, wherein the geo-probe integration operation is configured to assess geo-model characterization of simulated well pressure;

a history match advisor operation configured to generate the history match static model including a combined display of time dependent and depth dependent representation of the well data;

a spatio-temporal operation configured to generate a space and time visualization of the well data as well as a history match quality visualization including a plurality of graphical elements within a well plot, each of the plurality of graphical elements corresponding to one of the plurality of wells in the well field and representing a history match quality for at least one of the dynamic well data measurements;

a front operation configured to track simulated injected fluid front using the well data; and an insight operation configured to report static changes between the model of the well field and the history match static model.

2. The system of claim 1, wherein the trend operation generates a time-lapse pressure plot display for the at least one CRR including seismic and geologic faults overlaid on a pressure group map display for all wells in the CRR.

3. The system of claim 1, wherein the geo-probe integration operation is configured to output a visualization to compare simulated pressures for all wells within a CRR and provide a reference for observed pressure data.

4. The system of claim 1, wherein the history match advisor operation is configured to display a plurality of history match parameters including match quality of simulated time-lapse datum pressure to observed datum pressure.

5. The system of claim 1, wherein the front operation is configured to generate a spatial and time visualization of fluid front advance through well water-cut data.

6. The system of claim 1, wherein the insight operation is configured to generate a visualization of well results including a graphical element representing permeability for each well.

7. The system of claim 1, wherein the at least one history matching processor is further configured to calibrate the model of the well field using at least one determination of the functional operations.

8. The system of claim 1, wherein the at least one history matching processor is further configured to calibrate the model of the well field using time dependent and depth dependent parameters simultaneously.

* * * * *